(12) United States Patent
Lee

(10) Patent No.: US 12,200,555 B2
(45) Date of Patent: *Jan. 14, 2025

(54) METHOD AND APPARATUS FOR PERFORMING MOBILITY IN WIRELESS COMMUNICATION SYSTEM

(71) Applicant: LG Electronics Inc., Seoul (KR)

(72) Inventor: Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,359

(22) Filed: Aug. 25, 2023

(65) Prior Publication Data

US 2023/0413138 A1  Dec. 21, 2023

Related U.S. Application Data

(63) Continuation of application No. 17/312,813, filed as application No. PCT/KR2020/000585 on Jan. 13, 2020, now Pat. No. 11,778,530.

(30) Foreign Application Priority Data

Jan. 11, 2019 (KR) .................. 10-2019-0004019

(51) Int. Cl.
*H04W 4/00* (2018.01)
*H04W 36/08* (2009.01)
*H04W 36/30* (2009.01)

(52) U.S. Cl.
CPC .......... *H04W 36/08* (2013.01); *H04W 36/30* (2013.01)

(58) Field of Classification Search
CPC ... H04W 36/08; H04W 36/30; H04W 36/362; H04W 36/0058; H04W 36/00835; H04W 36/0011; H04W 76/27; H04W 76/30
USPC .......................................................... 370/331
See application file for complete search history.

(56) References Cited

U.S. PATENT DOCUMENTS

| 8,665,826 | B2 * | 3/2014 | Dimou ............. H04W 36/0016 |
| | | | 455/436 |
| 9,107,136 | B2 * | 8/2015 | Whinnett ............. H04W 36/30 |
| 9,491,670 | B2 * | 11/2016 | Takano .................. H04L 5/001 |
| 10,433,224 | B2 * | 10/2019 | Wu ........................ H04W 36/08 |
| 10,512,004 | B2 * | 12/2019 | Loehr .................. H04W 36/36 |
| 10,721,654 | B2 * | 7/2020 | Byun ................ H04W 36/0009 |

(Continued)

*Primary Examiner* — Amancio Gonzalez
(74) *Attorney, Agent, or Firm* — Fish & Richardson P.C.

(57) ABSTRACT

The present disclosure relates to method and apparatus for performing mobility in wireless communication system. According to an embodiment of the present disclosure, a method performed by a wireless device in a wireless communication system comprises: receiving a first message comprising handover commands of candidate target cells, each of the handover commands being related to an index; receiving a second message comprising the index related to a first handover command of a candidate target cell among the handover commands, and a second handover command of the candidate target cell; updating the first handover command based on the second handover command; identifying that the candidate target cell satisfies a handover condition for the candidate target cell based on a measurement result for the candidate target cell; and performing a handover to the candidate target cell satisfying the handover condition based on the updated first handover command.

10 Claims, 21 Drawing Sheets

(56) References Cited

U.S. PATENT DOCUMENTS

| | | | |
|---|---|---|---|
| 10,827,019 B2* | 11/2020 | Rubin | H04L 63/062 |
| 10,945,168 B2* | 3/2021 | Park | H04W 36/36 |
| 11,356,908 B2* | 6/2022 | Wu | H04W 76/15 |
| 11,576,095 B2* | 2/2023 | Peisa | H04W 36/06 |
| 2011/0263260 A1* | 10/2011 | Yavuz | H04W 36/0085 455/437 |
| 2014/0135020 A1* | 5/2014 | Dimou | H04W 36/0016 455/437 |
| 2015/0271713 A1* | 9/2015 | Kim | H04W 76/15 455/437 |
| 2018/0343595 A1* | 11/2018 | da Silva | H04L 5/005 |
| 2019/0380081 A1* | 12/2019 | Chang | H04W 36/18 |
| 2019/0387438 A1* | 12/2019 | Chang | H04W 36/0055 |
| 2020/0068448 A1* | 2/2020 | Byun | H04W 36/14 |
| 2020/0084683 A1* | 3/2020 | Moosavi | H04W 36/24 |
| 2020/0336957 A1* | 10/2020 | Wu | H04W 36/0085 |
| 2021/0289401 A1* | 9/2021 | Xu | H04W 36/24 |
| 2021/0321306 A1* | 10/2021 | Bin Redhwan | H04W 36/0058 |
| 2021/0337443 A1* | 10/2021 | Chang | H04W 36/00837 |
| 2021/0410039 A1* | 12/2021 | Da Silva | H04W 36/0079 |
| 2022/0007246 A1* | 1/2022 | de Silva | H04W 36/00837 |
| 2022/0014985 A1* | 1/2022 | Da Silva | H04W 76/27 |
| 2022/0116841 A1* | 4/2022 | Tenny | H04W 36/08 |
| 2022/0201561 A1* | 6/2022 | Bin Redhwan | H04W 36/0058 |

* cited by examiner

METHOD AND APPARATUS FOR PERFORMING MOBILITY IN WIRELESS COMMUNICATION SYSTEM

CROSS-REFERENCE TO RELATED APPLICATIONS

This application is a continuation of U.S. application Ser. No. 17/312,813, filed on Jun. 10, 2021, which is a National Stage application under 35 U.S.C. § 371 of International Application No. PCT/KR2020/000585, filed on Jan. 13, 2020, which claims the benefit of Korean Patent Application No. 10-2019-0004019, filed on Jan. 11, 2019. The disclosures of the prior applications are incorporated by reference in their entirety.

BACKGROUND OF THE DISCLOSURE

Field of the Disclosure

The present disclosure relates to method and apparatus for performing mobility in wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication system, a wireless device and/or user equipment (UE) may move along cells/base stations deployed in a wide range of areas. To provide proper services to the wireless device, the network should manage a mobility of the wireless device, and the wireless device should perform a mobility to another cell according to the mobility management. For example, the network may control a handover of the wireless device from a source cell to a target cell. The wireless may need to receive handover command(s) from the network, and apply the handover command(s) to perform a handover from the source cell to the target cell.

SUMMARY OF THE DISCLOSURE

Technical Problem

An aspect of the present disclosure is to provide method and apparatus for performing mobility in a wireless communication system.

Another aspect of the present disclosure is to provide method and apparatus for delta configuration (i.e., configuration update) of RRC reconfiguration in a wireless communication system.

Yet another aspect of the present disclosure is to provide method and apparatus for signalling of the delta configuration in a wireless communication system.

Yet another aspect of the present disclosure is to provide method and apparatus for delta configuration of mobility command in a mobility procedure in a wireless communication system.

Yet another aspect of the present disclosure is to provide method and apparatus for delta configuration of handover command in a handover procedure in a wireless communication system.

Technical Solution

According to an embodiment of the present disclosure, a method performed by a wireless device in a wireless communication system comprises: receiving a first message comprising handover commands of candidate target cells, each of the handover commands being related to an index; receiving a second message comprising the index related to a first handover command of a candidate target cell among the handover commands, and a second handover command of the candidate target cell; updating the first handover command based on the second handover command; identifying that the candidate target cell satisfies a handover condition for the candidate target cell based on a measurement result for the candidate target cell; and performing a handover to the candidate target cell satisfying the handover condition based on the updated first handover command.

According to an embodiment of the present disclosure, a wireless device in a wireless communication system comprises: a transceiver; a memory; and at least one processor operatively coupled to the transceiver and the memory, and configured to: control the transceiver to receive a first message comprising handover commands of candidate target cells, each of the handover commands being related to an index, control the transceiver to receive a second message comprising the index related to a first handover command of a candidate target cell among the handover commands, and a second handover command of the candidate target cell, update the first mobility command based on the second mobility command, identify that the candidate target cell satisfies a handover condition for the candidate target cell based on a measurement result for the candidate target cell, and perform a handover to the candidate target cell satisfying the handover condition based on the updated first handover command.

According to an embodiment of the present disclosure, a method performed by a radio access network (RAN) node in a wireless communication system comprises: transmitting a first message comprising handover commands of candidate target cells, each of the handover commands being related to an index; and transmitting a second message comprising the index related to a first handover command of a candidate target cell among the handover commands, and a second handover command of the candidate target cell, wherein the second handover command includes parameter values of at least one first entry that are updated from those of the at least one first entry in the first handover command, and excludes parameter values of at least one second entry that are included in the first handover command.

According to an embodiment of the present disclosure, a radio access network (RAN) node in a wireless communication system comprises: a transceiver; a memory; and at least one processor operatively coupled to the transceiver and the memory, and configured to: control the transceiver to transmit a first message comprising handover commands of candidate target cells, each of the handover commands being related to an index, and control the transceiver to transmit a second message comprising the index related to a first handover command of a candidate target cell among the handover commands, and a second handover command of the candidate target cell, wherein the second mobility command includes parameter values of at least one first entry that are updated from those of the at least one first entry in the first mobility command, and excludes parameter values of at least one second entry that are included in the first mobility command.

According to an embodiment of the present disclosure, a processor for a wireless device in a wireless communication system is provided. The processor is configured to control the wireless device to perform operations comprising: receiving a first message comprising handover commands of candidate target cells, each of the handover commands being related to an index; receiving a second message comprising the index related to a first handover command of a candidate target cell among the handover commands, and a second handover command of the candidate target cell; updating the first handover command based on the second handover command; identifying that the candidate target cell satisfies a handover condition for the candidate target cell based on a measurement result for the candidate target cell; and performing a handover to the candidate target cell satisfying the handover condition based on the updated first handover command.

According to an embodiment of the present disclosure, a computer-readable medium having recorded thereon a program for performing each step of a method on a computer is provided. The method comprises: receiving a first message comprising handover commands of candidate target cells, each of the handover commands being related to an index; receiving a second message comprising the index related to a first handover command of a candidate target cell among the handover commands, and a second handover command of the candidate target cell; updating the first handover command based on the second handover command; identifying that the candidate target cell satisfies a handover condition for the candidate target cell based on a measurement result for the candidate target cell; and performing a handover to the candidate target cell satisfying the handover condition based on the updated first handover command.

Advantageous Effect

The present disclosure can have various advantageous effects.

For example, by transmitting an updated handover command including updated configuration parameters and excluding configuration parameters included in a previously transmitted handover command (i.e., configuration parameters that are not updated or remain the same), the network can send a handover command of reduced sized to the wireless device, in particular when multiple target cells are configured for conditional handover.

For example, it is beneficial to reduce signalling overhead in case when multiple target cells are configured for conditional handover or when conditional handover command is updated that the network transmits an updated handover command including updated configuration parameters and excluding configuration parameters included in a previously transmitted handover command (i.e., configuration parameters that are not updated or remain the same).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

MODE FOR INVENTION

Figure 1:
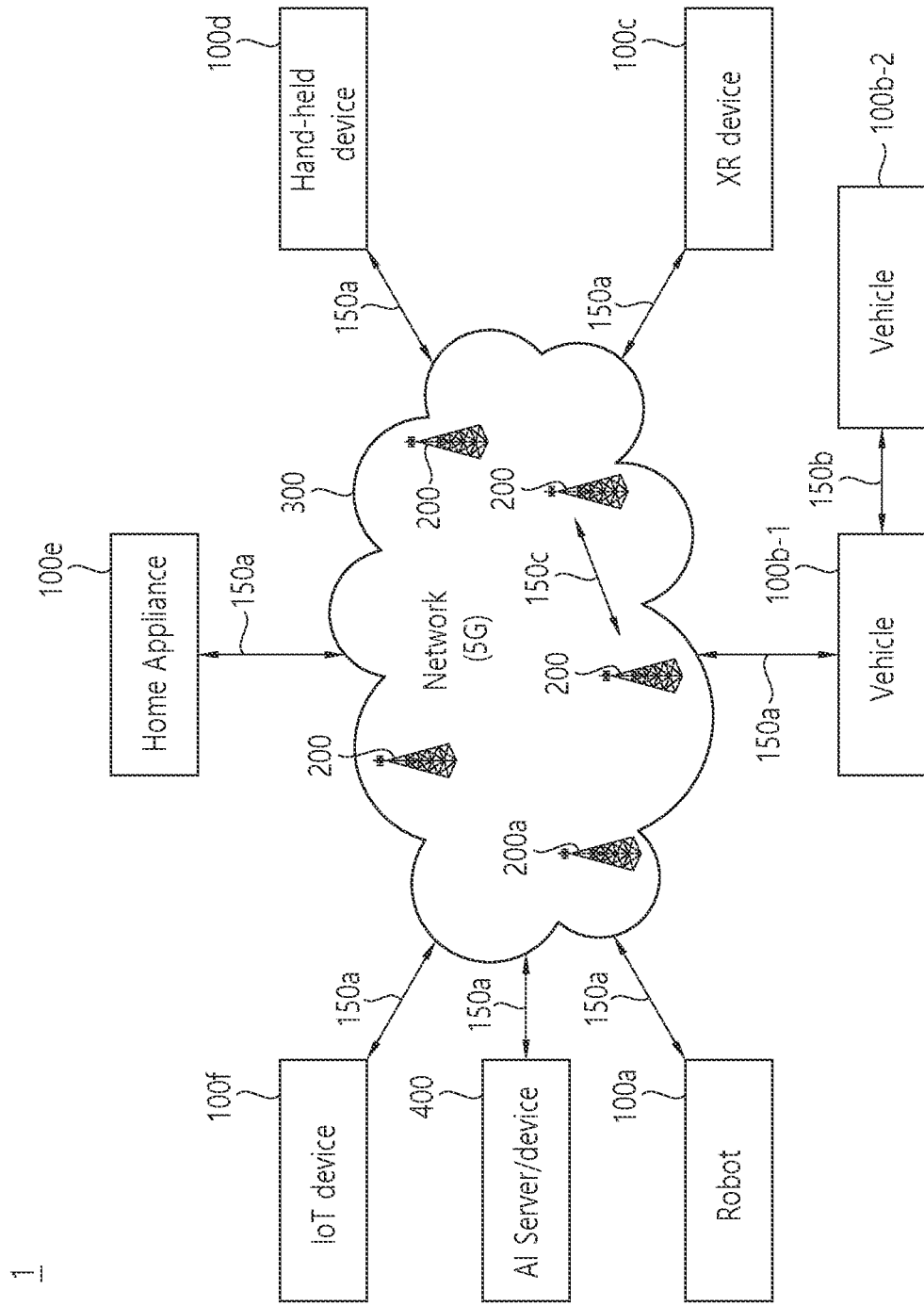
FIG. 1 illustrates an example of a communication system 1 to which implementations of the present disclosure is applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

'Mobility' refers to a procedure for i) changing a PCell of a UE (i.e., handover or PCell change), ii) changing a PSCell of a UE (i.e., SN change or PSCell change), and/or iii) adding a PSCell for a UE (i.e., SN addition or PSCell addition). Therefore, the mobility may comprise at least one of a handover, an SN change or an SN addition. In other words, the mobility may comprise at least one of PCell change, PSCell change or PSCell addition. Throughout the disclosure, performing a mobility to a target cell may refer to applying a mobility command of the target cell or applying RRC reconfiguration parameters in the mobility command of the target cell. Further, RRC reconfiguration and RRC connection reconfiguration may be used interchangeably.

'Mobility condition for a target cell' refers to a triggering condition for a mobility to the target cell. That is, the mobility condition for a target cell refers to a condition that should be satisfied for triggering a mobility to the target cell. Mobility condition may comprise at least one of an event, time-to-trigger (TTT), offset value, or threshold value(s). The mobility condition for an event may be satisfied if an entering condition for the event is satisfied for at least the TTT. For example, the entering condition for event A3 may be satisfied if a signal quality for a target cell is better than that for a source cell more than or equal to the offset value. For another example, the entering condition for event A5 may be satisfied if a signal quality for a target cell is better than a first threshold and a signal quality for a source cell is lower than a second threshold.

'Conditional mobility' refers to a mobility that is performed to a target cell which satisfies a triggering condition among a plurality of candidate target cells. Throughout the disclosure, performing a conditional mobility to a target cell may refer to applying a conditional mobility command of a target cell which satisfies a mobility condition for the target cell among a plurality of candidate target cells or applying RRC reconfiguration parameters in the conditional mobility command of the target cell which satisfies a mobility condition for the target cell among the plurality of candidate target cells.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 illustrates an example of a communication system 1 to which implementations of the present disclosure is applied.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices, base stations (BSs), and a network. Although FIG. 1 illustrates a 5G network as an example of the network of the communication system 1, the implementations of the present disclosure are not limited to the 5G system, and can be applied to the future communication system beyond the system.

The BSs and the network may be implemented as wireless devices and a specific wireless device 200*a* may operate as a BS/network node with respect to other wireless devices.

The wireless devices represent devices performing communication using radio access technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The handheld device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A user equipment (UE) may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to a fourth industrial revolution field. The unmanned aerial vehicle (UAV) may be, for example, an aircraft aviated by a wireless control signal without a human being onboard. The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet. The public safety device may include, for example, an image relay device or an image device that is wearable on the body of a user. The MTC device and the IoT device may be, for example, devices that do not require direct human intervention or manipulation. For example, the MTC device and the IoT device may include smartmeters, vending machines, thermometers, smartbulbs, door locks, or various sensors. The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure. The security device may be, for example, a device installed to prevent a danger that may arise and to maintain safety. For example, the security device may be a camera, a CCTV, a recorder, or a black box. The FinTech device may be, for example, a device capable of providing a financial service such as mobile payment. For example, the FinTech device may include a payment device or a point of sales (POS) system. The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f/BS 200-BS 200. Herein, the wireless communication/connections may be established through various RATs (e.g., 5G NR) such as uplink/downlink communication 150a and sidelink communication 150b (or D2D communication). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
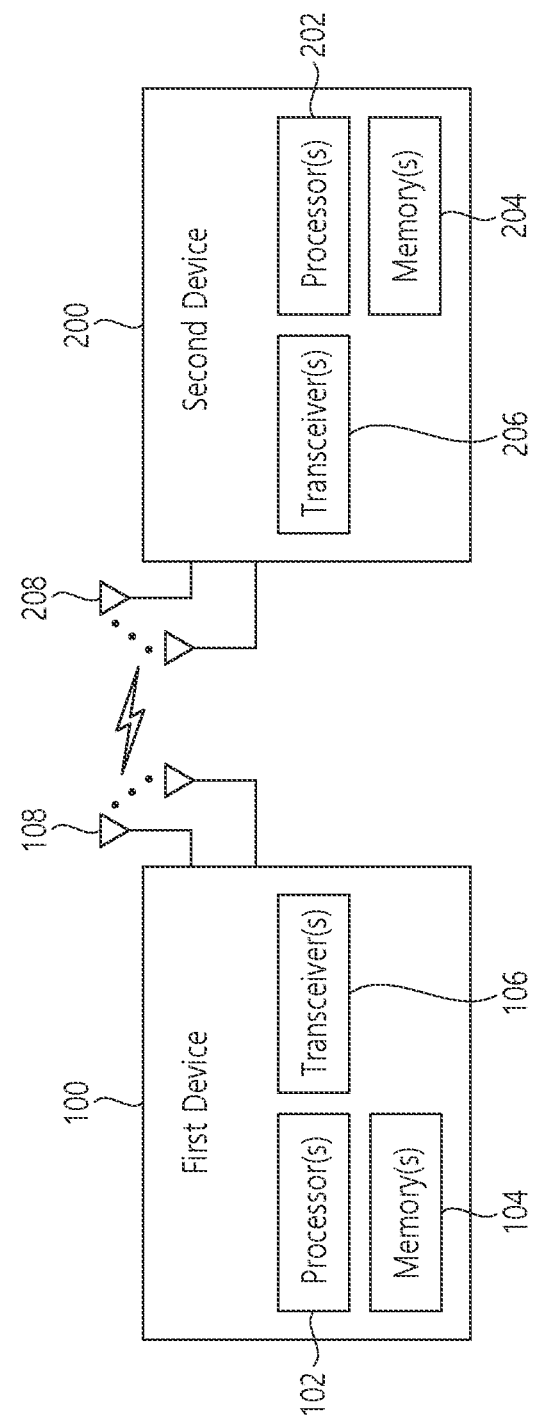
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
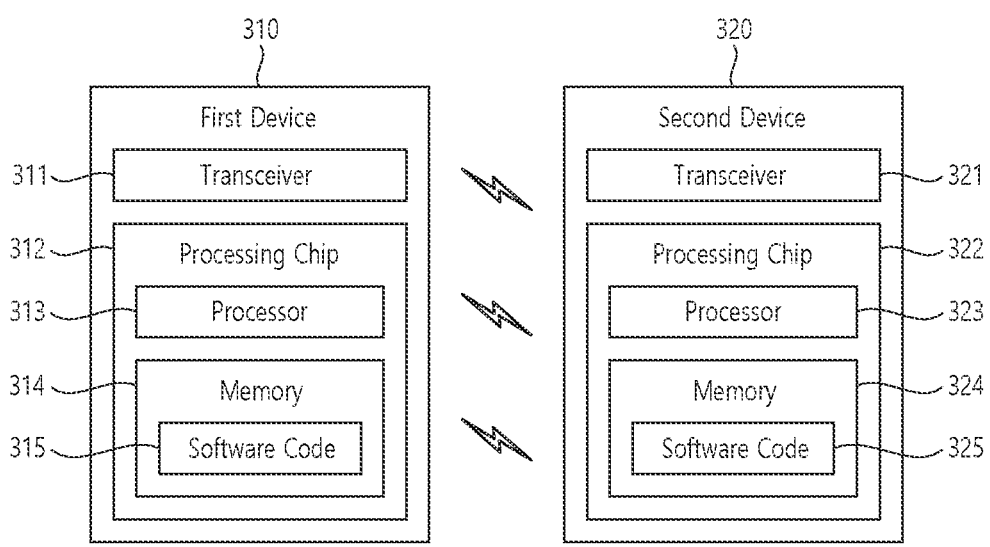
FIG. 3 shows another example of a wireless communication system to which the technical features of the present disclosure can be applied.

FIG. 3 shows another example of a wireless communication system to which the technical features of the present disclosure can be applied.

Referring to FIG. 3, the wireless communication system may include a first device 310 (i.e., first device 210) and a second device 320 (i.e., second device 220).

The first device 310 may include at least one transceiver, such as a transceiver 311, and at least one processing chip, such as a processing chip 312. The processing chip 312 may include at least one processor, such a processor 313, and at least one memory, such as a memory 314. The memory may be operably connectable to the processor 313. The memory 314 may store various types of information and/or instructions. The memory 314 may store a software code 315 which implements instructions that, when executed by the processor 313, perform operations of the first device 310 described throughout the disclosure. For example, the software code 315 may implement instructions that, when executed by the processor 313, perform the functions, procedures, and/or methods of the first device 310 described throughout the disclosure. For example, the software code 315 may control the processor 313 to perform one or more protocols. For example, the software code 315 may control the processor 313 to perform one or more layers of the radio interface protocol.

The second device 320 may include at least one transceiver, such as a transceiver 321, and at least one processing chip, such as a processing chip 322. The processing chip 322 may include at least one processor, such a processor 323, and at least one memory, such as a memory 324. The memory may be operably connectable to the processor 323. The memory 324 may store various types of information and/or instructions. The memory 324 may store a software code 325 which implements instructions that, when executed by the processor 323, perform operations of the second device 320 described throughout the disclosure. For example, the software code 325 may implement instructions that, when executed by the processor 323, perform the functions, procedures, and/or methods of the second device 320 described throughout the disclosure. For example, the software code 325 may control the processor 323 to perform one or more protocols. For example, the software code 325 may control the processor 323 to perform one or more layers of the radio interface protocol.

Figure 4:
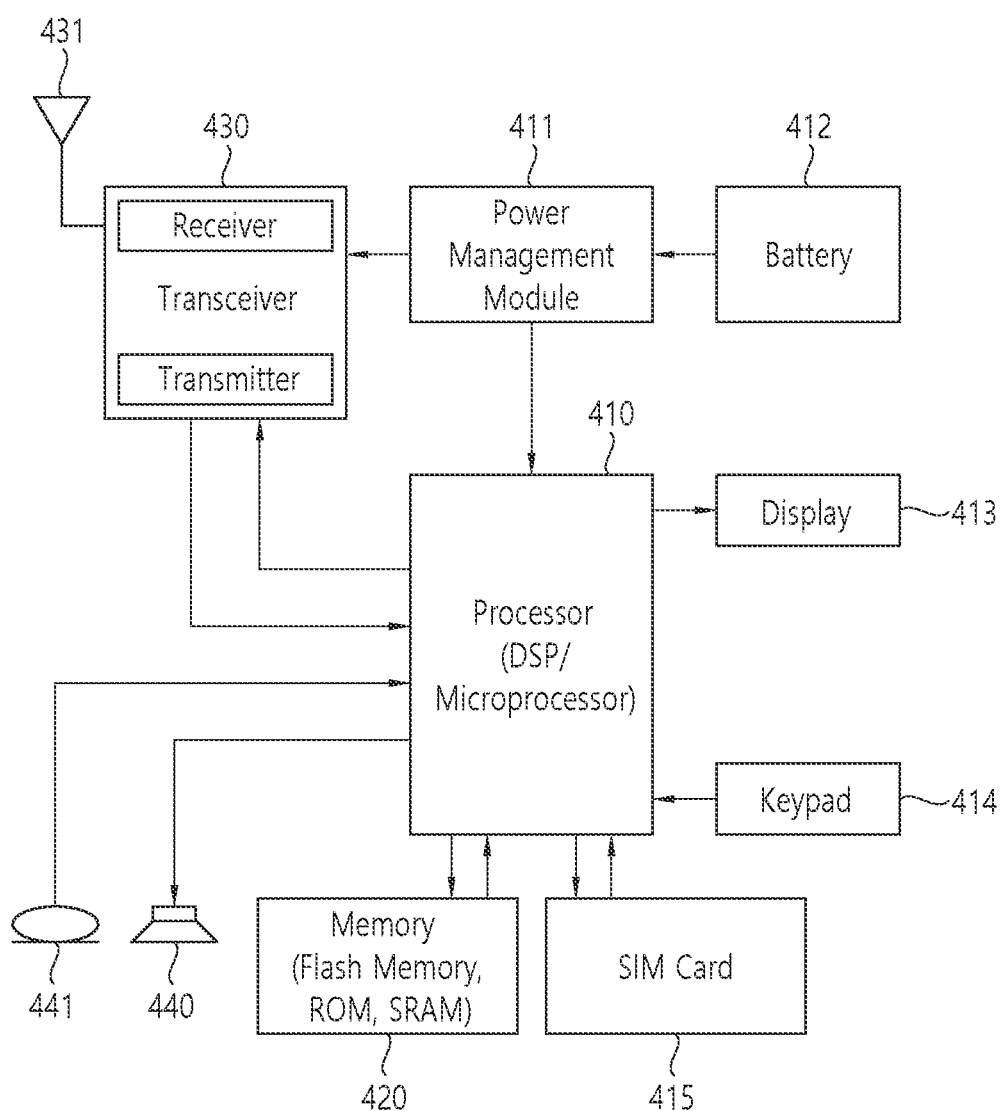
FIG. 4 shows a UE to implement an embodiment of the present disclosure.

FIG. 4 shows a UE to implement an embodiment of the present disclosure. The present disclosure described above for UE side may be applied to this embodiment.

A UE includes a processor 410, a power management module 411, a battery 412, a display 413, a keypad 414, a subscriber identification module (SIM) card 415, a memory 420, a transceiver 430, one or more antennas 431, a speaker 440, and a microphone 441.

The processor 410 may be configured to implement proposed functions, procedures and/or methods described in this description. Layers of the radio interface protocol may be implemented in the processor 410. The processor 410 may include application-specific integrated circuit (ASIC), other chipset, logic circuit and/or data processing device. The processor 410 may be an application processor (AP). The processor 410 may include at least one of a digital signal processor (DSP), a central processing unit (CPU), a graphics processing unit (GPU), a modem (modulator and demodulator). An example of the processor 410 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 410 may be configured to, or configured to control the transceiver 430 to implement steps performed by the UE and/or the wireless device throughout the disclosure.

The power management module 411 manages power for the processor 410 and/or the transceiver 430. The battery 412 supplies power to the power management module 411. The display 413 outputs results processed by the processor 410. The keypad 414 receives inputs to be used by the processor 410. The keypad 414 may be shown on the display 413. The SIM card 415 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 420 is operatively coupled with the processor 410 and stores a variety of information to operate the processor 410. The memory 420 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 420 and executed by the processor 410. The memory 420 can be implemented within the processor 410 or external to the processor 410 in which case those can be communicatively coupled to the processor 410 via various means as is known in the art.

The transceiver 430 is operatively coupled with the processor 410, and transmits and/or receives a radio signal. The transceiver 430 includes a transmitter and a receiver. The transceiver 430 may include baseband circuitry to process radio frequency signals. The transceiver 430 controls the one or more antennas 431 to transmit and/or receive a radio signal.

The speaker 440 outputs sound-related results processed by the processor 410. The microphone 441 receives sound-related inputs to be used by the processor 410.

Figure 5:
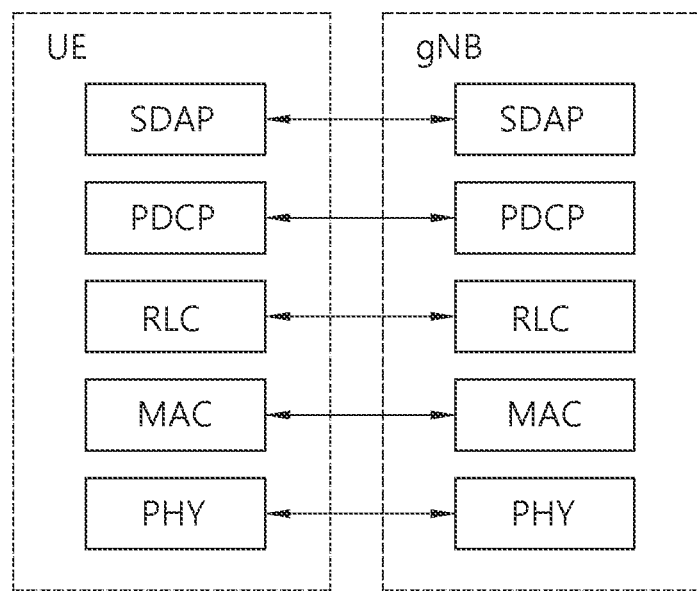
FIG. 5 shows a block diagram of a user plane protocol stack to which the technical features of the present disclosure can be applied.
Figure 6:
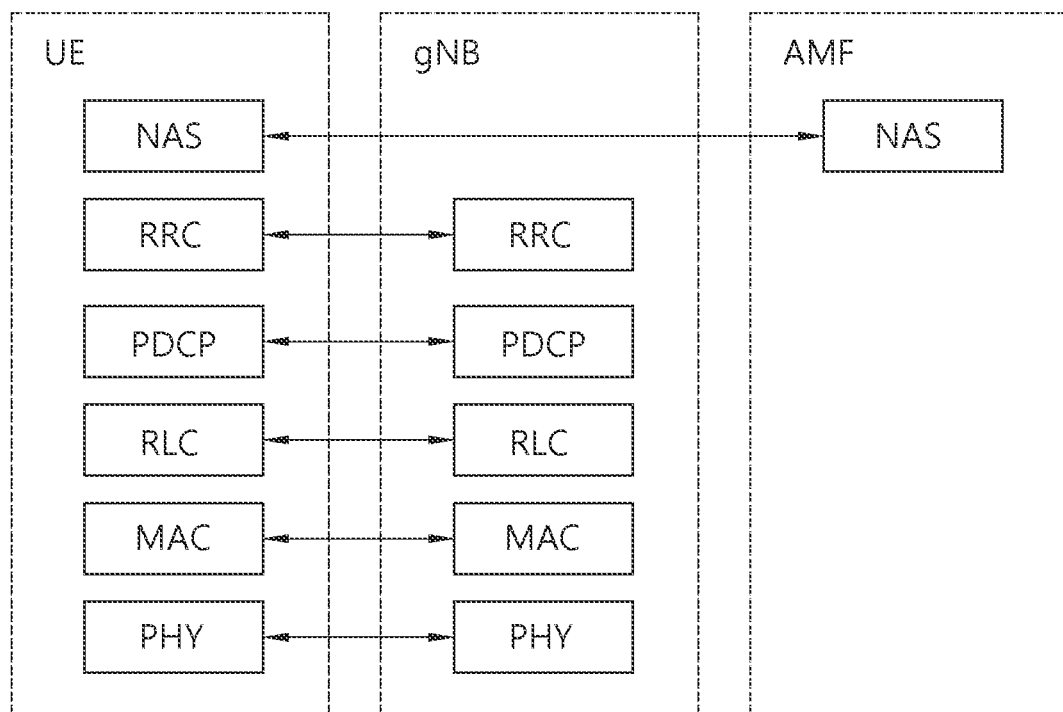
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bidirectional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
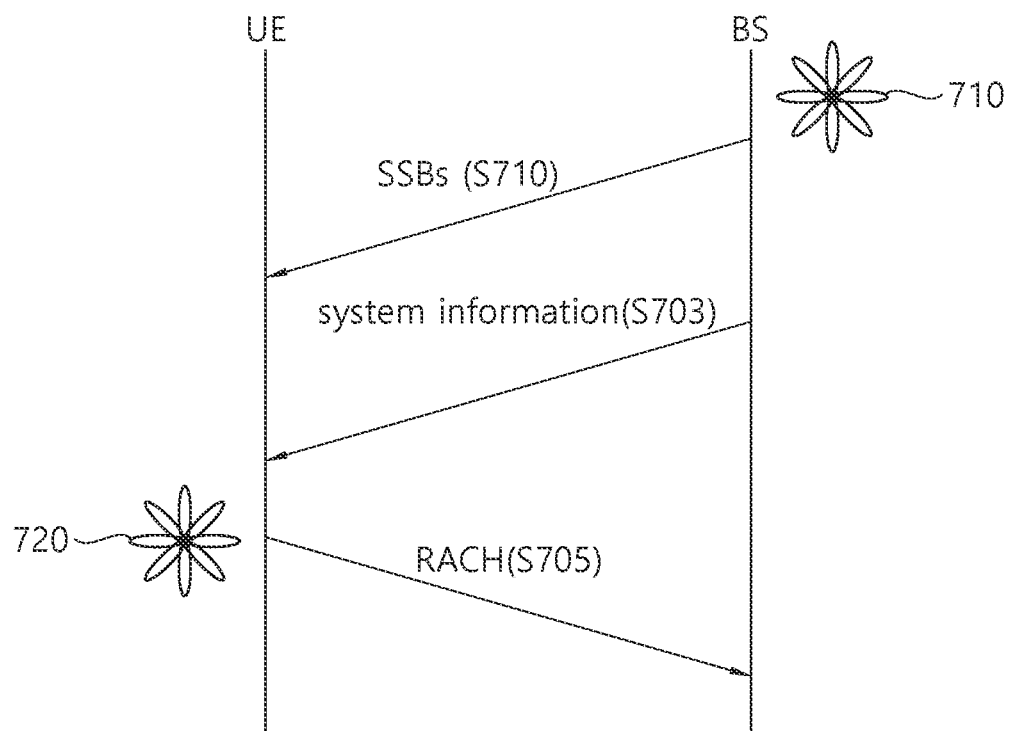
FIG. 7 illustrates an example of initial access procedure to which technical features of the present disclosure can be applied.

FIG. 7 illustrates an example of initial access procedure to which technical features of the present disclosure can be applied.

Referring to FIG. 7, in step S701, BS may transmit synchronization signal blocks (SSBs, or SS/PBCH blocks) to UE using downlink transmit (Tx) beams 710 of the BS. That is, the BS may sweep the downlink Tx beams 710 to transmit the SSBs to the UE. Different SSBs may be mapped to different downlink Tx beams 710. For example, the UE may select an SSB whose received power is highest among the received SSBs or higher than certain threshold among the received SSBs. The UE may synchronize to downlink based on synchronization signals (e.g., PSS, SSS) in the selected SSB.

In step S703, the BS may transmit system information to the UE. The UE may receive the system information from the BS based on the downlink synchronization. For example, the UE may receive MIB, SIB1 and optionally other SIBs from the BS successively. The system information may comprise RACH resource configuration.

In step S705, the UE may perform RACH transmissions toward the BS using uplink Tx beams 720 of the UE. That is, the UE may sweep the uplink Tx beams 720 to perform RACH transmissions toward the BS. The UE may perform RACH transmissions toward the BS based on the RACH resource configuration, which may comprise resource/configuration of the uplink Tx beams 720. Different RACH transmissions (e.g., random access preambles) may be mapped to different uplink Tx beams 720. If RACH procedure is successfully completed, the UE may synchronize to uplink.

Figure 8:
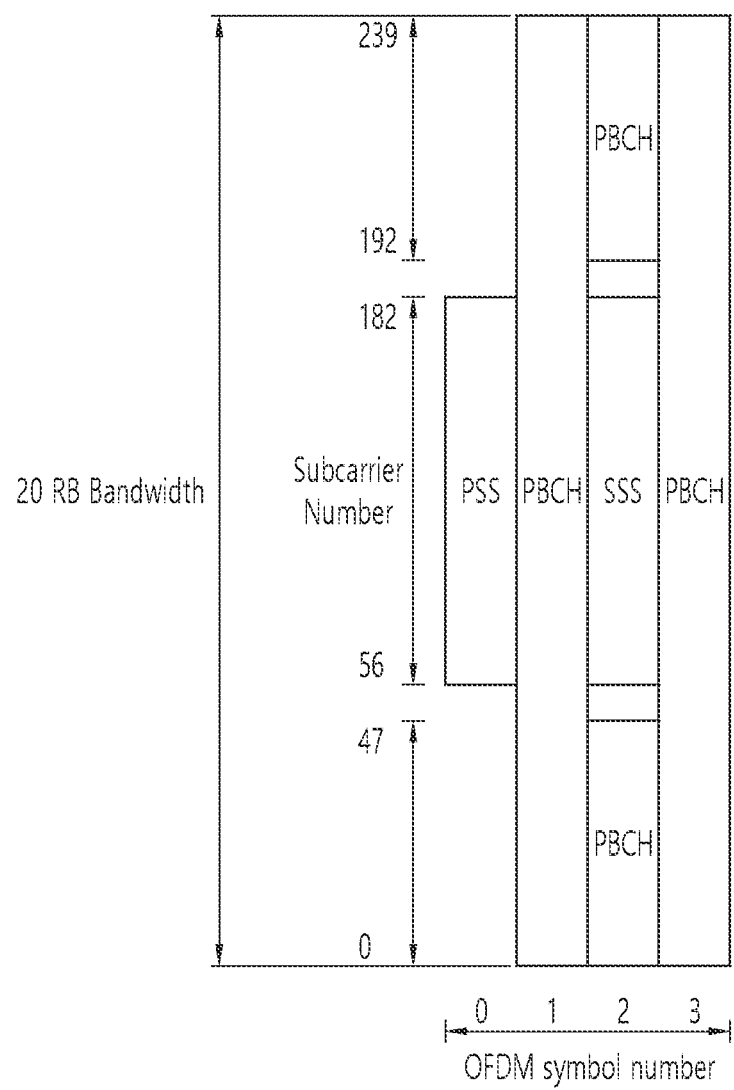
FIG. 8 shows an example of SSB structure to which technical features of the present disclosure can be applied.

FIG. 8 shows an example of SSB structure to which technical features of the present disclosure can be applied.

Referring to FIG. 8, the SSB may comprise PSS and SSS, each occupying 1 symbol and 127 subcarriers, and PBCH spanning across OFDM symbols and 240 subcarriers, but on one symbol leaving an unused part in the middle for SSS as shown in FIG. 8. The possible time locations of SSBs within a half-frame may be determined by sub-carrier spacing and the periodicity of the half-frames where SSBs are transmitted may be configured by the network. During a half-frame, different SSBs may be transmitted in different spatial directions (i.e. using different beams, spanning the coverage area of a cell).

Within the frequency span of a carrier, multiple SSBs can be transmitted. The Physical Cell IDs (PCIs) of SSBs transmitted in different frequency locations do not have to be unique, i.e. different SSBs in the frequency domain can have different PCIs. However, when an SSB is associated with a remaining minimum system information (RMSI, or SIB1), the SSB may correspond to an individual cell, which has a unique NR Cell Global Identity (NCGI). Such an SSB is referred to as a Cell-Defining SSB (CD-SSB). A Primary Cell (PCell) is always associated to a CD-SSB located on the synchronization raster.

Figure 9:
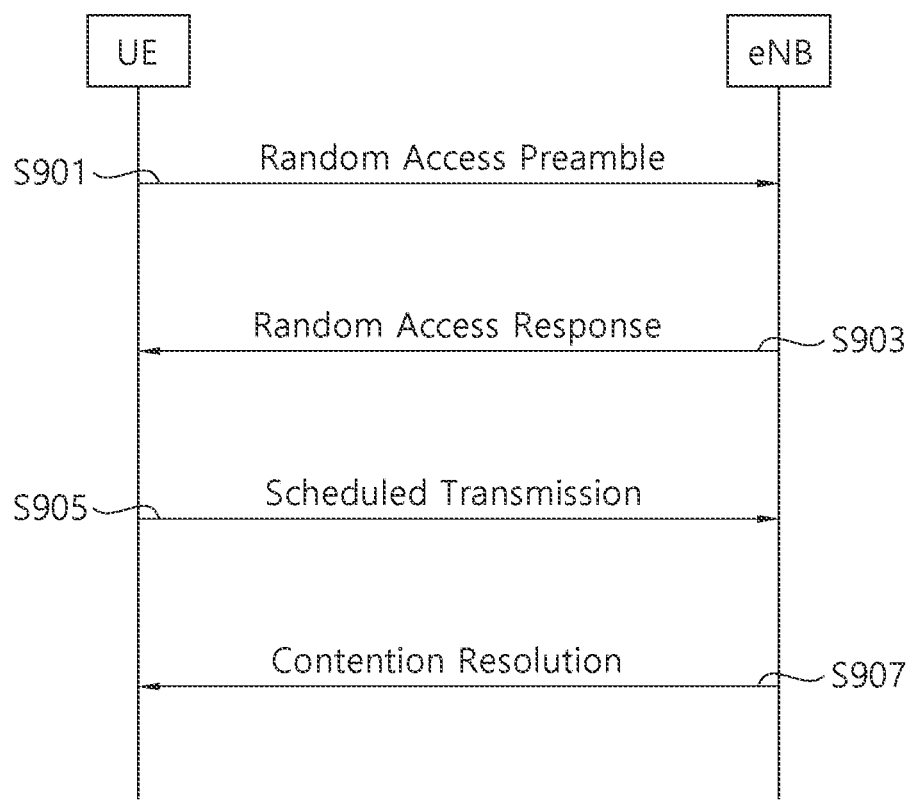
FIG. 9 shows an example of contention-based random access procedure to which technical features of the present disclosure can be applied.

FIG. 9 shows an example of contention-based random access procedure to which technical features of the present disclosure can be applied.

Referring to FIG. 9, in step S901, The UE may transmit a random access preamble (msg1) on RACH in uplink, to an evolved node B (eNB). There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.

In step S903, The UE may receive a random access response (msg2) generated by MAC on downlink-shared channel (DL-SCH), from the eNB. The random access response may be Semi-synchronous (within a flexible window of which the size is one or more transit time interval (TTI)) with the msg1. The random access response message comprises at least one of a random access preamble identifier, timing alignment information for a primary timing advance group (pTAG), initial uplink (UL) grant and assignment of temporary C-RNTI.

In step S905, the UE may transmit a device identification message (msg3) to the eNB. The device identification message may be a first scheduled UL transmission on UL-SCH. For initial access, the device identification message may comprise at least a NAS UE identifier. If the UE is in the RRC_CONNECTED state and has a C-RNTI, the device identification message may include the C-RNTI.

In step S907, the UE may receive a contention resolution message (msg4) from the eNB. The contention resolution message may be addressed to the temporary C-RNTI on PDCCH for initial access and after radio link failure, or addressed to the C-RNTI on PDCCH for UE in RRC_CO-NNECTED state. The temporary C-RNTI is promoted to C-RNTI for a UE which detects RA success and does not already have a C-RNTI. A UE which detects RA success and already has a C-RNTI resumes using the C-RNTI.

Figure 10:
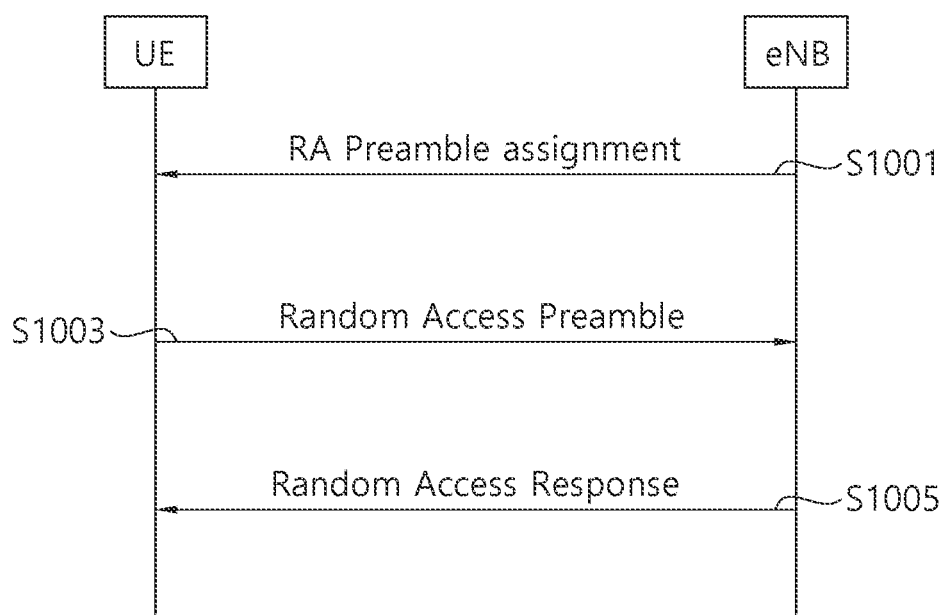
FIG. 10 shows an example of contention-free random access procedure to which technical features of the present disclosure can be applied.

FIG. 10 shows an example of contention-free random access procedure to which technical features of the present disclosure can be applied. The steps illustrated in FIG. 10 may be all or part of the step S703 in FIG. 7.

Referring to FIG. 10, in step S1001, the UE may receive a random access preamble assignment via dedicated signalling in DL, from the eNB. The eNB may assign to UE a non-contention random access preamble (i.e., a random access preamble not within the set sent in broadcast signalling).

In step S1003, the UE may transmit a random access preamble (msg1) on RACH in uplink, to the eNB. The UE transmits the assigned non-contention random access preamble.

In step S1005, the UE may receive a random access response (msg2) on DL-SCH, from the eNB. The random access response message may comprise at least one of timing alignment information and UL grant for handover, timing alignment information for DL data arrival, or random access preamble identifier.

Figure 11:
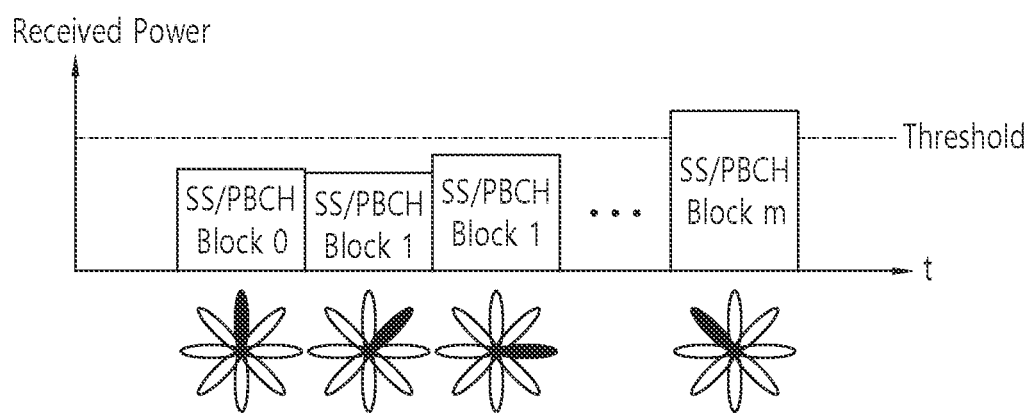
FIG. 11 shows an example of an association between SSB and RACH resource to which technical features of the present disclosure can be applied.

FIG. 11 shows an example of an association between SSB and RACH resource to which technical features of the present disclosure can be applied.

Referring to FIG. 11, each SSB is associated with a specific RACH resource comprising at least one of a RACH transmission beam, RACH transmission occasion, or RACH preamble. The system information may provide information (e.g., RACH resource configuration) for the UE to determine the association between the SSB and the RACH resource. The RSRP threshold for SSB selection for RACH resource association may be configurable by network. For example, UE may select an SSB whose RSRP is highest among the received SSBs, or higher than the RSRP threshold among the received SSBs. Then, the UE may perform RACH transmissions toward the BS based on a RACH resource associated with the selected SSB.

Figure 12:
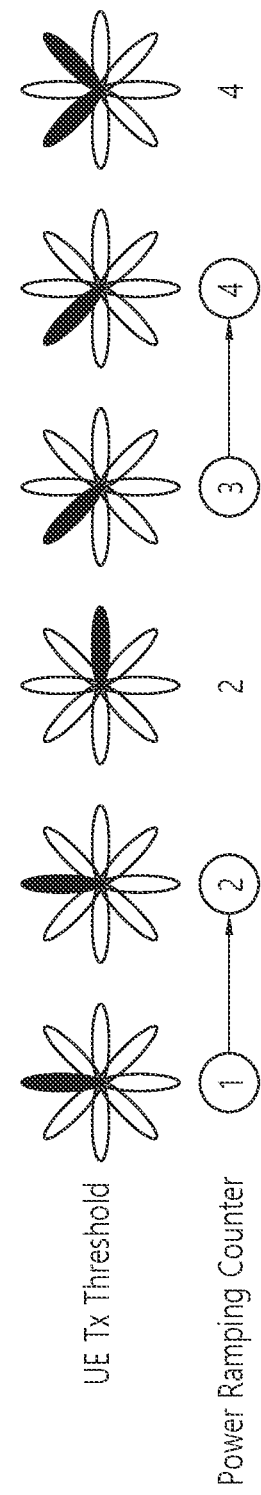
FIG. 12 shows an example of power ramping for RACH transmission to which technical features of the present disclosure can be applied.

FIG. 12 shows an example of power ramping for RACH transmission to which technical features of the present disclosure can be applied.

Referring to FIG. 12, the UE may increase the power ramping counter by 1 when the UE retransmit the random access preamble using the same beam. However, when the beam has been changed, the power ramping counter remains unchanged. In other words, the UE may perform power ramping for retransmission of the random access preamble based on a power ramping counter. However, the power ramping counter remains unchanged if a UE conducts beam switching in the PRACH retransmissions.

Figure 13:
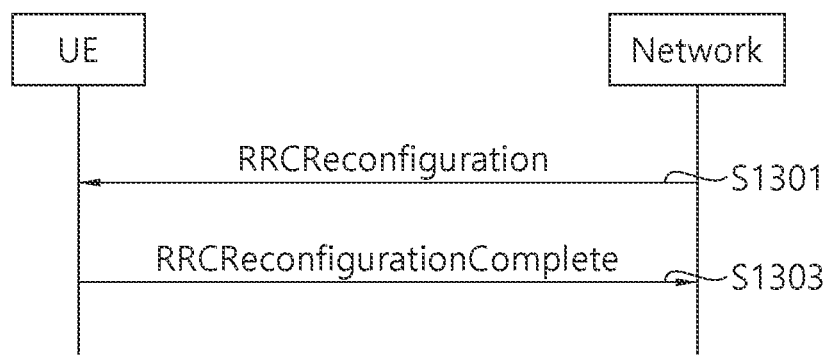
FIG. 13 shows an example of RRC reconfiguration procedure if the RRC reconfiguration is successful to which technical features of the present disclosure can be applied.

FIG. 13 shows an example of RRC reconfiguration procedure if the RRC reconfiguration is successful to which technical features of the present disclosure can be applied.

Referring to FIG. 13, in step S1301, the network may transmit an RRCReconfiguration message to the UE. For example, a source RAN node may transmit the RRCReconfiguration message comprising a handover command of a target RAN node for a handover from the source RAN node to the target RAN node.

In step S1303, if RRC reconfiguration is successful, the UE may transmit an RRCReconfigurationComplete message to the network. The RRCReconfigurationComplete message may comprise a handover complete message which informs that the UE successfully performed a handover from the source RAN node to the target RAN node. For example, if the UE successfully performed a handover from the source RAN node to the target RAN node—that is, if the UE successfully applied the handover command of the target RAN node, the UE may transmit the handover complete message to the target RAN node.

Figure 14:
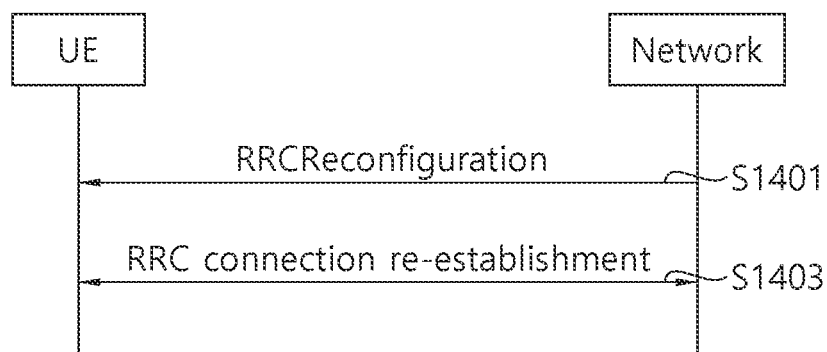
FIG. 14 shows an example of RRC reconfiguration procedure if the RRC reconfiguration fails to which technical features of the present disclosure can be applied.

FIG. 14 shows an example of RRC reconfiguration procedure if the RRC reconfiguration fails to which technical features of the present disclosure can be applied.

Referring to FIG. 14, in step S1401, the network may transmit an RRCReconfiguration message to the UE. For example, a source RAN node may transmit the RRCReconfiguration message comprising a handover command of a target RAN node for a handover from the source RAN node to the target RAN node.

In step S1403, if RRC reconfiguration fails, the UE and the network may perform RRC connection re-establishment. For example, if the UE fails to perform a handover from the source RAN node to the target RAN node—that is, if the UE fails to apply the handover command of the target RAN node, the UE and the source RAN node may perform RRC connection re-establishment.

The purpose of the RRC reconfiguration procedure as illustrated in FIGS. 13 and 14 may be to modify an RRC connection, e.g. to establish/modify/release RBs, to perform reconfiguration with sync, to setup/modify/release measurements, to add/modify/release SCells and cell groups. As part of the procedure, NAS dedicated information may be transferred from the Network to the UE.

In E-UTRAN—NR (EN)—dual connectivity (DC), SRB3 can be used for measurement configuration and reporting, to (re-)configure MAC, RLC, physical layer and RLF timers and constants of the SCG configuration, and to reconfigure PDCP for DRBs associated with the S-KgNB or SRB3, provided that the (re-)configuration does not require any MeNB involvement.

The network may initiate the RRC reconfiguration procedure to the UE in RRC_CONNECTED. The network may apply the procedure as follows:

The establishment of RBs (other than SRB1, that is established during RRC connection establishment) is performed only when AS security has been activated;

The addition of Secondary Cell Group and SCells is performed only when AS security has been activated;

The reconfigurationWithSync is included in secondary-CellGroup only when at least one DRB is setup in SCG.

Figure 15:
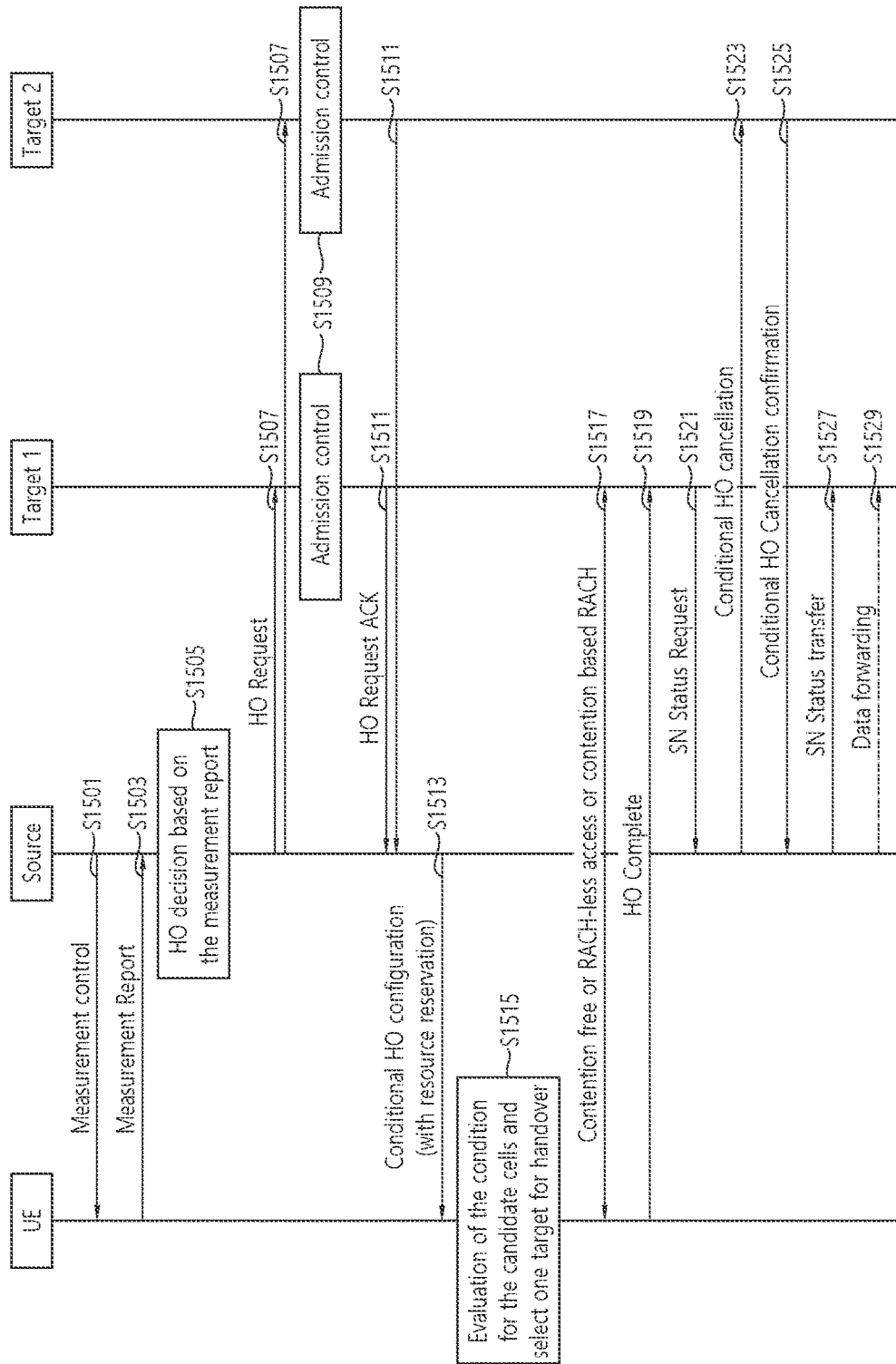
FIG. 15 shows an example of a conditional handover procedure to which technical features of the present disclosure can be applied.

FIG. 15 shows an example of a conditional handover procedure to which technical features of the present disclosure can be applied.

Referring to FIG. 15, in step S1501, the source cell may transmit measurement control message to the UE. The source cell may configure the UE measurement procedures according to the roaming and access restriction information and, for example, the available multiple frequency band information through the measurement control message. Measurement control information provided by the source cell through the measurement control message may assist the function controlling the UE's connection mobility. For example, the measurement control message may comprise measurement configuration and/or report configuration.

In step S1503, the UE may transmit a measurement report message to the source cell. The measurement report message may comprise a result of measurement on neighbor cell(s) around the UE which can be detected by the UE. The UE may generate the measurement report message according to a measurement configuration and/or measurement control information in the measurement control message received in step S1501.

In step S1505, the source cell may make a handover (HO) decision based on the measurement report. For example, the source cell may make a HO decision and determine candidate target cells (e.g., target cell 1 and target cell 2) for HO among neighbor cells around the UE based on a result of measurement (e.g., signal quality, reference signal received power (RSRP), reference signal received quality (RSRQ)) on the neighbor cells.

In step S1507, the source cell may transmit HO request messages to the target cell 1 and the target cell 2 which are determined in step S1505. That is, the source cell may perform handover preparation with the target cell 1 and the target cell 2. The HO request message may comprise necessary information to prepare the handover at the target side (e.g., target cell 1 and target cell 2).

In step S1509, each of the target cell 1 and the target cell 2 may perform an admission control based on information included in the HO request message. The target cell may configure and reserve the required resources (e.g., C-RNTI and/or RACH preamble). The AS-configuration to be used in the target cell can either be specified independently (i.e. an "establishment") or as a delta compared to the AS-configuration used in the source cell (i.e. a "reconfiguration").

In step S1511, the target cell and the target cell 2 may transmit a HO request acknowledge (ACK) message to the source cell. The HO request ACK message may comprise information on resources reserved and prepared for a handover. For example, the HO request ACK message may comprise a transparent container to be sent to the UE as an RRC message to perform the handover. The container may include a new C-RNTI, target gNB security algorithm identifiers for the selected security algorithms, a dedicated RACH preamble, and/or possibly some other parameters i.e. access parameters, SIBs. If RACH-less handover is configured, the container may include timing adjustment indication and optionally a preallocated uplink grant. The HO request ACK message may also include RNL/TNL information for forwarding tunnels, if necessary. As soon as the source cell receives the HO request ACK message, or as soon as the transmission of the handover command is initiated in the downlink, data forwarding may be initiated.

In step S1513, the source cell may transmit a conditional HO (CHO) configuration to the UE. The CHO configuration may be also referred to as conditional reconfiguration. The CHO configuration may comprise a CHO configuration for each of the candidate target cells (e.g., target cell 1, target cell 2). For example, the CHO configuration may comprise a CHO configuration for the target cell 1, and a CHO configuration for the target cell 2. The CHO configuration for the target cell 1 may comprise a handover condition for the target cell 1, and a handover command of the target cell 1. The handover command of the target cell 1 may comprise RRC reconfiguration parameters for a handover to the target cell 1, including information on resources reserved for the handover to the target cell 1. Similarly, the CHO configuration for the target cell 2 may comprise a handover condition for the target cell 2, and a handover command of the target cell 2. The handover command of the target cell 2 may comprise RRC reconfiguration parameters for a handover to the target cell 2, including information on resources reserved for the handover to the target cell 2.

In step S1515, the UE may perform an evaluation of the handover condition for the candidate target cells (e.g., target cell 1, target cell 2) and select a target cell for handover among the candidate target cells. For example, the UE may perform measurements on the candidate target cells, and determine whether a candidate target cell satisfies a handover condition for the candidate target cell among the candidate target cells based on a result of the measurements on the candidate target cells. If the UE identifies that the target cell 1 satisfies a handover condition for the target cell 1, the UE may select the target cell 1 as a target cell for the handover.

In step S1517, the UE may perform a random access to the selected target cell (e.g., target cell 1). For example, the UE may transmit a random access preamble to the target cell 1, and receive a random access response comprising an uplink grant from the target cell 1. If RACH-less handover is configured, the step S1517 may be omitted, and the uplink grant may be provided in step S1513.

In step S1519, the UE may transmit a HO complete message to the target cell 1. When the UE has successfully accessed the target cell 1 (or, received uplink grant when RACH-less HO is configured), the UE may transmit a HO complete message comprising a C-RNTI to confirm the handover, along with uplink buffer status report, whenever possible, to the target cell 1 to indicate that the handover procedure is completed for the UE. The target cell 1 may verify the C-RNTI transmitted in the HO complete message.

In step S1521, the target cell 1 may transmit a sequence number (SN) status request message to the source cell. The target cell 1 may request the source cell to inform the target cell 1 of a SN of a packet the target cell 1 has to transmit after the handover, via the SN status request message.

In step S1523, the source cell may transmit a CHO cancellation message to the target cell 2 which is not selected as a target cell for a handover among the candidate target cells. After receiving the CHO cancellation message, the target cell 2 may release resources that are reserved in case of a handover.

In step S1525, the target cell 2 may transmit a CHO cancellation confirmation message to the source cell, as a response for the CHO cancellation message. The CHO cancellation confirmation message may inform that the target cell 2 has released resources reserved in case of a handover.

In step S1527, the source cell may transmit a SN status transfer message to the target cell 1, as a response for the SN status request message. The SN status transfer message may inform the target cell 1 of a SN of a packet the target cell 1 has to transmit after the handover.

In step S1529, the source cell may perform a data forwarding to the target cell 1. For example, the source cell may forward data received from a core network to the target cell 1 so that the target cell 1 can now transmit the data to the UE.

For conditional handover, UE may report many cells or beams as the possible candidate HO targets based on the radio resource management (RRM) measurement. gNB may issue the conditional handover commands for one or multiple candidate target cells reported by the UE. Within the CHO configuration, the candidate target cells may be configured with different HO conditions (e.g., event, TTT, offset value, to-be-measured RS and/or threshold) and possibly uplink access resources for UE access (e.g. random access preambles).

As illustrated in FIG. 15, when the UE receives a CHO configuration (including a handover command for the conditional handover), the UE may start evaluating the handover condition for CHO while continuing to operate based on current RRC configuration of the UE. When the UE determines that the HO condition for conditional HO is fulfilled, the UE may disconnect from the source cell, and apply the CHO configuration and access to the target cell.

From the network side, the base station related to the source cell may need to prepare the handover with one or multiple target cells. For example, the source cell may need to request the candidate target cell(s) to perform admission control and reserve the radio resources accordingly. There may be multiple options (on the exact time point) for the source cell to stop data transmission to the UE, and to start data forwarding to the candidate target cells. The source cell will know the exact target cell for the UE after the target cell indicates to the source cell that it is selected as the exact target cell when the handover procedure is successfully executed.

CHO is essentially a network-configured but UE-controlled downlink mobility mechanism with a potential to reduce the interruption time and handover failure (HOF)/radio link failure (RLF).

The HO condition may not be fulfilled for a long time period and hence the UE will stay in the source cell. In this case, the source cell must have the possibility to perform further reconfigurations either to change the UE operation in the current source cell or to command the UE to handover to a suitable target cell.

If conditional handover is configured, UE may receive multiple handover commands for multiple target cells, and will finally select a single target cell to perform handover.

According to conditional handover procedure as illustrated in FIG. 15, one or more RRC reconfiguration messages to be transmitted to the UE may include multiple handover commands. Thus, signaling overhead may be expected to be significant for support of conditional handover.

In the conditional handover procedure, UE may receive a first configuration from a source cell and then receive handover command including a second configuration from the target cell. Upon receiving the second configuration after applying the first configuration with a configured parameter value, if the configured parameter value is absent in the second configuration, UE maintains the configured parameter value of the first configuration after applying the second configuration i.e. after completing handover to the target cell.

Various embodiments of the present disclosure can be applied to conditional mobility, in which one or more candidate cells are determined based on a mobility condition first, and actual mobility is performed towards one of the candidate cells. The conditional mobility may include conditional handover, conditional SCG change, and/or conditional SCG addition. The mobility command may be a message used for 'reconfiguration with sync'.

Figure 16:
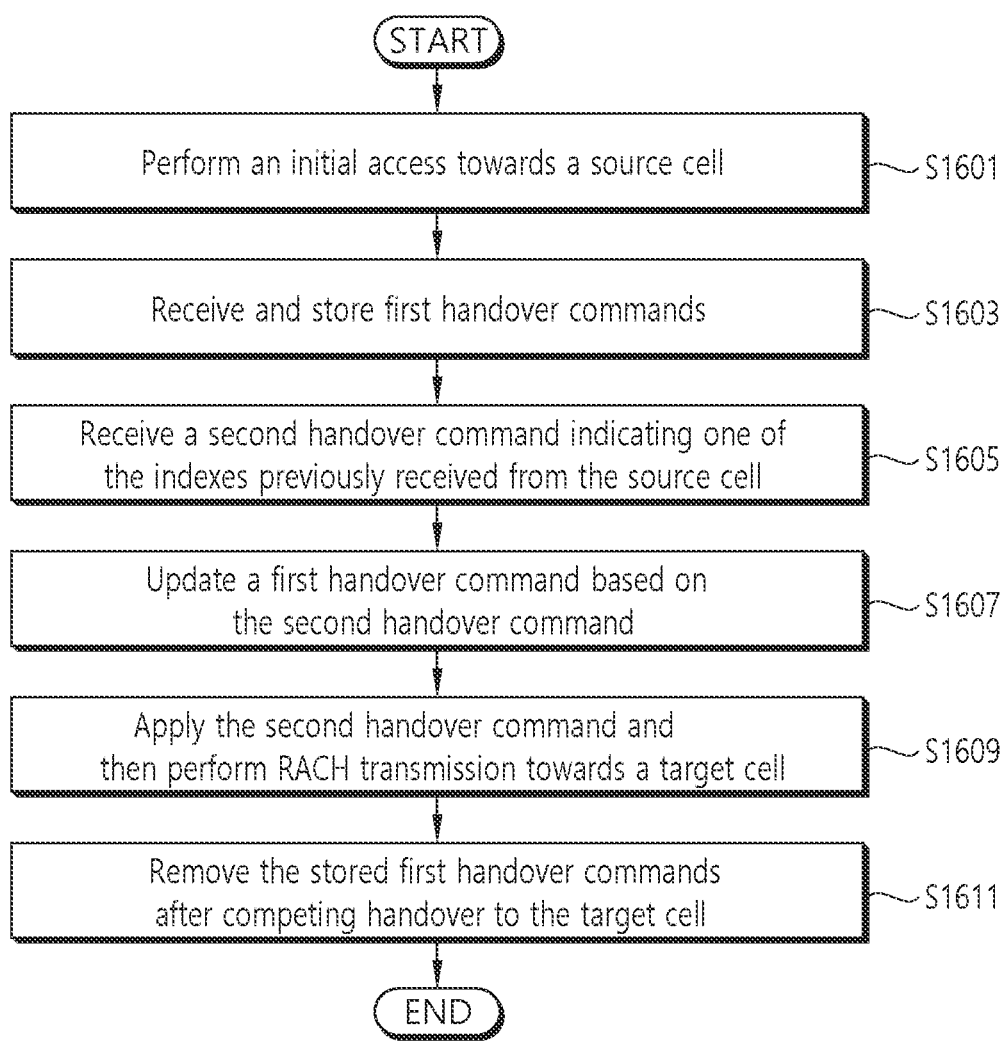
FIG. 16 shows an example of a method to perform a handover to a target cell according to an embodiment of the present disclosure.

FIG. 16 shows an example of a method to perform a handover to a target cell according to an embodiment of the present disclosure. The steps illustrated in FIG. 16 may be performed by a wireless device and/or a UE.

Referring to FIG. 16, in step S1601, the UE may perform an initial access towards a source cell. The UE establishes a connection with a source RAN node at the source cell. To perform the initial access, the UE may perform RACH procedure towards the source cell.

In step S1603, the UE may receive and store first handover commands. While connected to a source cell, the UE may receive and store more than one first mobility commands (i.e., first handover commands) from a source cell. Different mobility commands may be used for mobility to different first target cells. The first target cells may be cells which the UE may finally configure as serving cells. Different mobility commands may be identified by different indexes (e.g., target cell ID). The UE may also receive the indexes related to the first mobility commands together with the first mobility commands from the source cell.

In step S1605, the UE may receive a second handover command indicating one of the indexes previously received from the source cell. While connected to the source cell, UE may receive a second mobility command (i.e., second handover command) indicating one of the indexes previously received from the source cell. The second mobility command may be used for mobility to the second target cell. The second target cell may be one of the first target cells or a target cell other than the first target cells which UE may finally configure as a serving cell. The second mobility command may be associated with a mobility condition for mobility to the second target cell.

In step S1607, the UE may update the first handover command based on the second handover command. If a particular parameter value included in a first mobility command (i.e., first handover command) identified by the indicated index among the first mobility commands is absent in the second mobility command (i.e., second handover command), UE may add the particular parameter value to the second mobility command to obtain the updated first mobility command. That is, the UE may replace parameter values included in the first mobility command with those included in the second mobility command to obtain the updated first mobility command. The first mobility command may be associated with a validity time. UE may start a timer upon receiving the first mobility command. If the timer reaches the validity time, the timer expires and so UE may invalidate the first mobility command. If the first mobility command is valid based on the validity time (i.e., the timer has not reached the validity time and/or the timer has not expired), UE may add the particular parameter value to the second mobility command. If the first mobility command is invalid based on the validity time (i.e., the timer has reached the validity time and/or the timer has expired), UE may apply the second mobility command without adding the particular parameter to the second mobility command or may discard the second mobility command. The UE may remove association between the indicated index and the first mobility command, and then consider that the indicated index is reused for the second mobility command after storing the second mobility command. Alternatively, if a new index is received for the second mobility command in addition to the index related to the first mobility command, UE may keep storing the first mobility command in association with the indicated index and store the second mobility command in associated with the new index.

In step S1609, the UE may apply the second handover command and then perform RACH transmission towards a target cell. If mobility condition for the second target cell is met for mobility to the second target cell, UE may apply the second mobility command (i.e., second handover command) with the added parameter value and then perform RACH transmission (i.e., random access preamble) towards the second target cell for mobility. Then, the UE may receive an uplink grant as a response, and transmit a mobility complete message to the second target cell based on the uplink grant if the UE successfully performed a mobility to the second target cell. If RACH-less mobility is configured, the UE may not perform the RACH transmission. Instead, the UE may transmit a mobility complete message to the second target cell based on an uplink grant previously received before, if the UE successfully performed a mobility to the second target cell.

In step S1611, the UE may remove the stored first handover commands after completing handover to the target cell (e.g., after transmitting the handover complete message to the second target cell).

Figure 17:
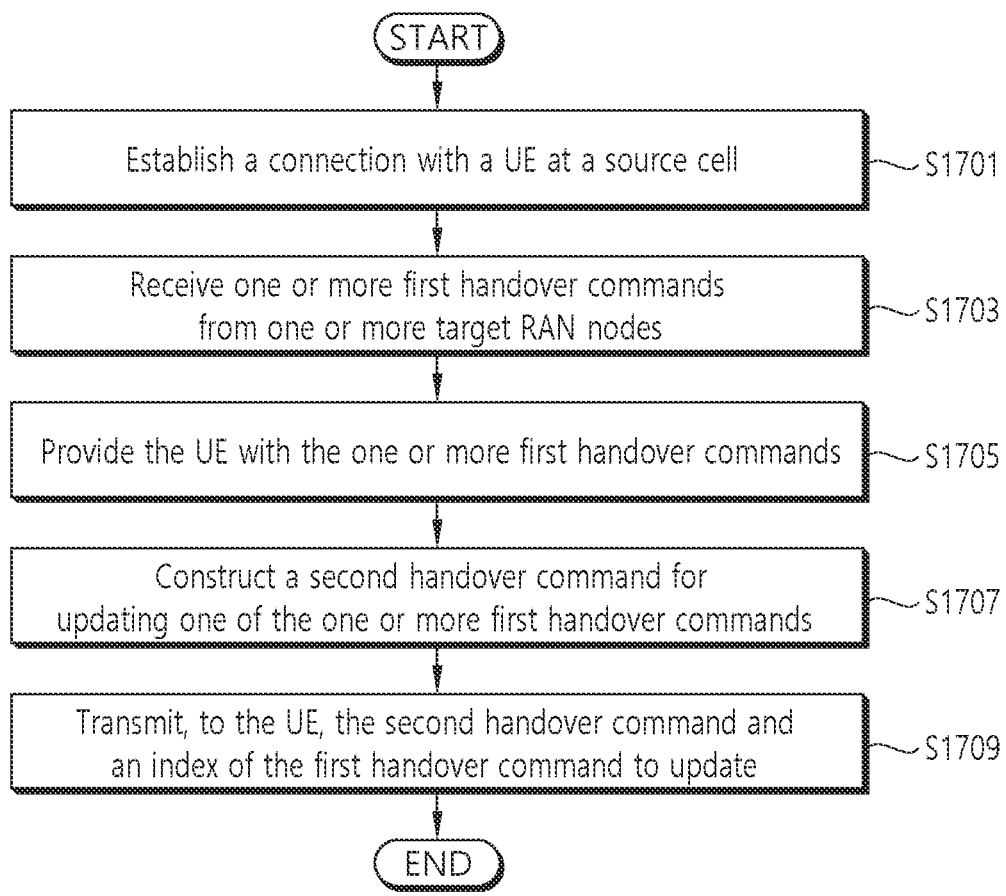
FIG. 17 shows an example of a method for performing a handover to a target cell according to an embodiment of the present disclosure.

FIG. 17 shows an example of a method for performing a handover to a target cell according to an embodiment of the present disclosure. The steps illustrated in FIG. 17 may be performed by a source RAN node (or, source gNB, source eNB, source base station, source cell).

Referring to FIG. 17, in step S1701, the source RAN node may establish a connection with a UE at a source cell.

In step S1703, the source RAN node may receive one or more first handover commands from one or more target RAN nodes. The source RAN node may request the first mobility commands (i.e., first handover commands) to the target RAN nodes via mobility request messages and then the target RAN nodes may provide the first mobility commands to the source RAN node via mobility request ACK messages. Different first mobility commands may be identified by different indexes. The index value may be set by the source RAN node or the target RAN nodes. The index may be associated with a cell of the target RAN nodes and may be the identity of the associated cell of the target RAN nodes.

In step S1705, the source RAN node may provide the UE with the one or more first handover commands. Different first mobility commands (i.e., first handover commands) may be identified by different indexes. Different mobility commands may be used for UE's mobility to different first target cells. Different first mobility commands may be contained in different containers of a RRC message (e.g., conditional reconfiguration message or CHO configuration message) delivered to the UE. The first mobility command may be associated with a mobility condition for UE's mobility to a target cell. The source RAN node may provide the UE with the mobility condition as well as the first mobility command.

In step S1707, the source RAN node may construct a second handover command for updating one of the one or more handover mobility commands. The source RAN node or one of the target RAN nodes may choose one of the first mobility commands (i.e., first handover commands) and the construct a second mobility command (i.e., second handover command) in which a particular parameter value included in the chosen first mobility command is absent. The index identifying the chosen first mobility command or a new index may be used to identify the second mobility command. The absent particular parameter value may be implicitly included in the second mobility command. If one of the target RAN nodes construct the second mobility command, the source gNB may receive the second mobility commands from the target RAN node. The second mobility command may be used for UE's mobility to the second target cell. The second mobility command may be associated with a mobility condition for mobility to the second target cell. If the mobility condition is met for mobility to the second target cell, UE may apply the second mobility command with the added parameter value and then perform RACH transmission towards the second target cell for mobility. However, if RACH-less mobility is configured, the UE may not perform the RACH transmission. The first mobility command may be associated with a validity time. UE may start a timer upon receiving the first mobility command. If the timer reaches the validity time, the timer expires and so UE may invalidate the first mobility command. The particular parameter value can be absent only if the first mobility command is valid based on the validity time (i.e., the timer has not reached the validity time and/or the timer has not expired).

In step S1709, the source RAN node may transmit, to the UE, the second handover command and an index of the first handover command to update. The source RAN node may transmit the second mobility command (i.e., second handover command) to the UE with the index that was previously received by the UE. The second mobility command may be used for mobility to the second target cell. The second mobility command may be associated with a mobility condition for mobility to the second target cell. The source RAN node may provide the UE with the mobility condition as well as the second mobility command. The second mobility command may be associated with a target cell of the target RAN nodes. If a particular parameter value included in the first mobility command (i.e., first handover command) identified by the indicated index is absent in the second mobility command, UE may add the particular parameter value to the second mobility command to obtain the updated first mobility command. That is, the UE may replace parameter values included in the first mobility command with those included in the second mobility command to obtain the updated first mobility command.

After step S1709, if the target RAN node receives an uplink message (i.e., handover complete message) from the UE at a target cell associated with the index and the second mobility command (i.e., second handover command), the target RAN node may consider mobility (i.e., handover) to be successfully completed for the UE. The target RAN node may apply the second mobility command to the UE. The uplink message (i.e., mobility complete message) may be transmitted via RACH procedure initiated by the UE. If RACH-less mobility is configured, the UE may not perform the RACH transmission. Instead, the UE may transmit a mobility complete message to the second target cell based on an uplink grant previously received before, if the UE successfully performed a mobility to the second target cell.

Figure 18:
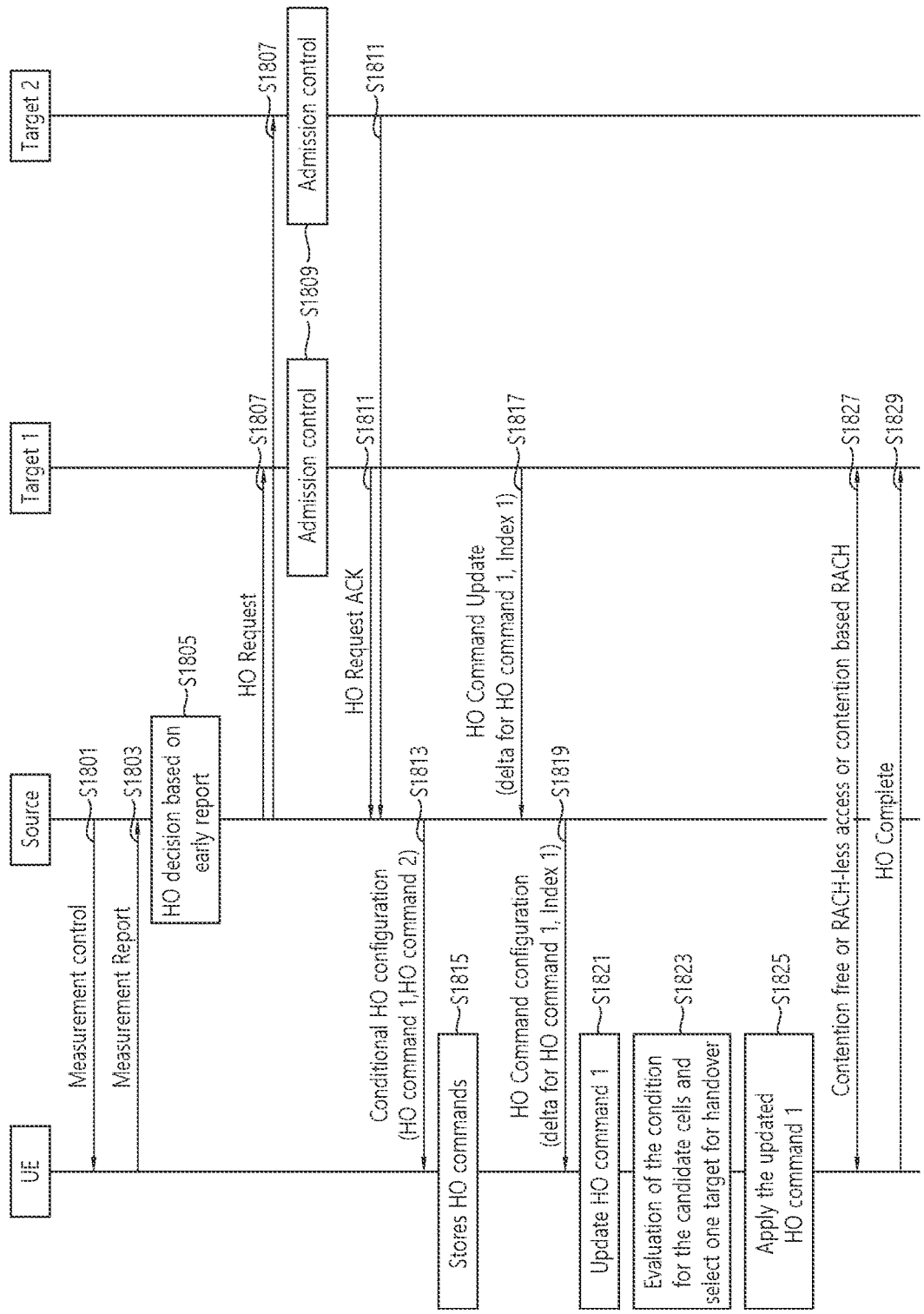
FIG. 18 shows an example of signal flows for updating a handover command in a handover procedure according to an embodiment of the present disclosure.

FIG. 18 shows an example of signal flows for updating a handover command in a handover procedure according to an embodiment of the present disclosure. The steps performed by UE in FIG. 18 can also be performed by a wireless device.

Referring to FIG. 18, in step S1801, while the UE is connected to a source cell of a source RAN node, the UE may receive a measurement control message comprising a measurement configuration from the source RAN node. That is, measurement may be configured by the source RAN node via the measurement control message. The UE may perform measurement based on the measurement configuration. Though not illustrated in FIG. 18, before step S1801, the UE may establish a connection with a source RAN node at a source cell. To establish a connection with the source RAN node, the UE may perform initial access towards the source cell, and/or perform RACH procedure towards the source cell.

In step S1803, if a measurement report is triggered, the UE may send the measurement report to the source RAN node.

In step S1805, the source RAN node may make a HO decision based on the measurement report. That is, based on the measurement report or so, the source RAN node may select one or more target cells (e.g., target cell 1 and target cell 2) of one or more target gNBs for conditional handover.

In step S1807, the source RAN node may transmit HO request messages to the target cell 1 and the target cell 2. The source RAN node may request conditional handover to the target RAN nodes via the HO request messages.

In step S1809, each of the target cell 1 and the target cell 2 may perform an admission control based on information included in the HO request message. The target cell may configure and reserve the required resources (e.g., C-RNTI and/or RACH preamble).

In step S1811, the target RAN nodes may provide their handover commands (i.e., handover command 1 of the target cell 1, and handover command 2 of the target cell 2) to the source RAN node via HO request ACK messages. The first handover commands (i.e., HO command 1 and HO command 2) may be identified by different indexes. For example, HO command 1 may be identified by index 1, and HO command 2 may be identified by index 2. The index value may be set by the source RAN node or the target RAN nodes. The index may be associated with the target cell of the target gNBs. For example, the index may be the identity of the associated cell of the target gNBs. The source RAN node may receive two handover commands from the target RAN nodes. Different handover commands, (i.e. HO command 1 & 2) may be used for handover to different target cells (i.e. target cell 1 & 2). For example, HO command 1 may be used for handover to target cell 1, and HO command 2 may be used for handover to target cell 2. Different handover commands may be identified by different indexes.

In step S1813, the source RAN node may construct a RRC message (e.g., conditional reconfiguration message or CHO configuration message) containing two handover commands received from the target RAN nodes, and then transmit the RRC message to the UE. While connected to the source cell, UE may receive the RRC message including the handover commands. Each handover command may indicate/be related to an index and a handover condition.

In step S1815, the UE may store the received handover commands with their indexes and handover conditions.

At least one of the target RAN nodes may update its handover command. Alternatively, the source RAN node may update one of the handover commands. For updating the handover command, the source RAN node or the target RAN nodes may choose the handover command previously transmitted to the UE, and then construct an updated handover command in which a particular parameter value included in the chosen handover command is absent. If one of the target RAN nodes (e.g., target cell 1) updates the handover command, in step S1817, the target RAN node (e.g., target cell 1) may provide the updated handover command (e.g., delta for HO command 1) to the source RAN node with an index (e.g., index 1) related to the handover command.

In step S1819, the source RAN node may transmit the updated handover command to the UE with the index associated with the chosen previous handover command. The updated handover command may be used for handover to the target cell 1. The updated handover command may be associated with a mobility condition for handover to the target cell 1. While connected to the source cell, UE may receive the updated handover command for the target cell 1.

In step S1821, UE may update HO command 1. If a particular parameter value included in the previous handover command identified by the indicated index is absent in the updated handover command, UE may add the particular parameter value to the updated handover command. That is, the UE may replace parameter values included in the previous handover command with those included in the updated handover command. The handover command may be associated with a validity time. UE may start a timer upon receiving a handover command. If the timer reaches the validity time, the timer expires and so UE may invalidate the handover command. If the handover command is valid based on the validity time (i.e., the timer has not reached the validity time and/or the timer has not expired) and an updated handover command is received, UE may add the particular parameter value to the updated handover command. If the handover command is invalid based on the validity time (i.e., the timer has reached the validity time and/or the timer has expired), UE may apply the updated handover command without the particular parameter or discards the updated handover command.

To identify the updated handover command, the index identifying the previous handover command or a new index may be used. For example, UE may remove association between the indicated index and the previous handover command from UE's storage. Then, UE may consider the indicated index is reused for the updated handover command after storing the updated handover command. Alternatively, if a new index is received together with the updated handover command in addition to the index related to the previous handover command, UE may keep storing the previous handover command in association with the indicated index while storing the updated handover command in association with the new index for the target cell 1.

In step S1823, the UE may evaluate handover condition for target cells and select a target cell for handover. For example, the UE may perform measurements on two target cells (e.g., target cell 1 and target cell 2). Based on a result of the measurements, the UE may identify that the handover condition is met for handover to the target cell 1.

In step S1825, the UE may apply the handover command stored for the target cell 1 with the added parameter value. Then, UE may synchronize to downlink of the target cell 1.

In step S1827, the UE may perform RACH transmission towards the target cell 1. In a random access procedure, the UE may receive an uplink grant. If RACH-less handover is configured, the step S1827 may be omitted, and the uplink grant may be provided in advance.

In step S1829, the UE may transmit a MAC PDU containing a handover complete message to the target cell 1 based on the uplink grant. After successfully completing handover, the UE may remove the handover commands stored for the other target cell (e.g., target cell 2) from UE's storage.

Figure 19:
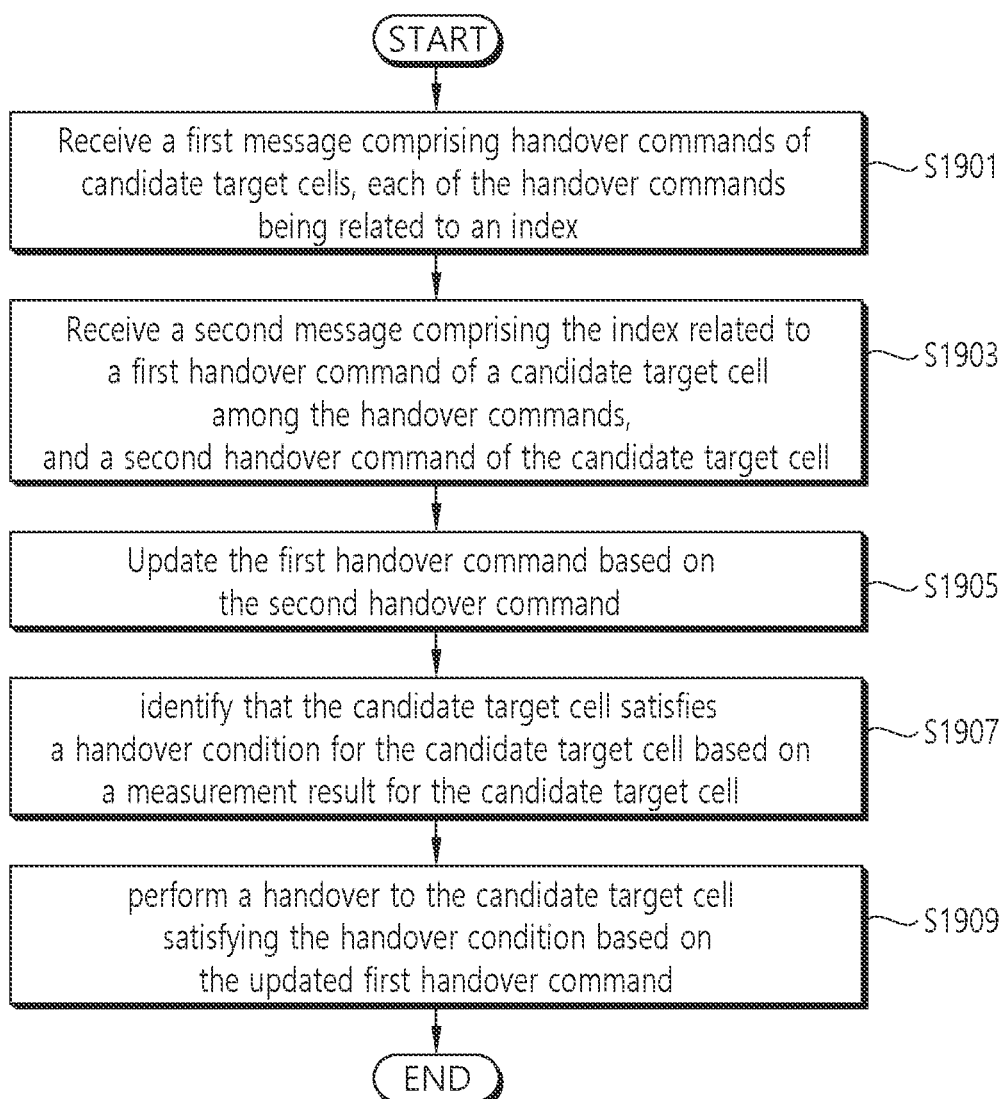
FIG. 19 shows an example of a method for handover according to an embodiment of the present disclosure.

FIG. 19 shows an example of a method for handover according to an embodiment of the present disclosure. The steps illustrated in FIG. 19 may be performed by a wireless device and/or UE.

Referring to FIG. 19, in step S1901, the wireless device may receive a first message comprising handover commands of candidate target cells, each of the handover commands being related to an index. The index may also be referred to as configuration identity. The first message may be a conditional reconfiguration message or CHO configuration message. Throughout the disclosure, the candidate target cell can be simply referred to as target cell.

In step S1903, the wireless device may receive a second message comprising the index related to a first handover command of a candidate target cell among the handover commands, and a second handover command of the candidate target cell. The second message may be received after the first message is received. The first handover command may comprise RRC reconfiguration parameters for a handover to the candidate target cell, and the second handover command may comprise one or more updated RRC reconfiguration parameters for a handover to the candidate target cell. For example, the second handover command may include parameter values of at least one first entry that are updated from those (or, different from) of the at least one first entry in the first handover command, and excludes parameter values of at least one second entry that are included in the first handover command. That is, the parameter values of the at least one second entry in the first handover command may not be included in the second handover command.

In step S1905, the wireless device may update the first handover command based on the second handover command. For example, the wireless device may identify, in the first handover command, the parameter values of the at least one second entry that are excluded in the second handover command. Then, the wireless device may add the parameter values of the at least one second entry to the second handover command to obtain an updated version of the first handover command. For another example, the wireless device may replace the parameter values of the at least one first entry in the first handover command with those of the at least one first entry in the second handover command to obtain an updated version of the first handover command. Herein, the updated version of the first handover command may also be referred to as updated first handover command. Therefore, the updated first handover command may comprise parameter values of at least one first entry included in the second handover command, and parameter values of at least one second entry included in the first handover command.

In step S1907, the wireless device may identify that the candidate target cell satisfies a handover condition for the candidate target cell based on a result of a measurement on the candidate target cell. The wireless device may determine whether the candidate target cell satisfies a handover condition for the candidate target cell or does not satisfy the handover condition for the candidate target cell based on a result of a measurement on the candidate target cell (e.g., signal quality, RSRP, RSRQ).

In step S1909, the wireless device may perform a handover to the candidate target cell satisfying the handover condition based on the updated first handover command. The wireless device may apply the updated first handover command of the candidate target cell satisfying the handover condition to perform a handover to the candidate target cell.

According to various embodiments, the first message may comprise at least one of a handover command of each of the candidate target cells, an index related to the handover command, or a handover condition for each of the candidate target cells. For example, the first message may comprise at least one of the first handover command of the candidate target cell, the index related to the first handover command, or a handover condition for the candidate target cell. The handover condition may be a triggering condition for a handover to a target cell.

According to various embodiments, the index related to a handover command may comprise an index of a candidate target cell related to the handover command.

According to various embodiments, the wireless device may store the handover commands in the first message. The wireless device may identify, among the stored handover commands, the first handover command related to the index included in the second message. The wireless device may update the identified first handover command based on the second handover command included in the second message.

According to various embodiments, the first handover command may be related to a validity timer which starts to run upon receiving the first handover command. The first handover command may be valid while the validity timer is running, and may be invalid after an expiry of the validity timer.

According to various embodiments, the wireless device may receive second message comprising the second handover command while the validity timer is running. The second handover command may include parameter values of at least one first entry that are updated from (or, different from) those of the at least one first entry in the first handover command, and exclude parameter values of at least one second entry that are included in the first handover command. That is, parameter values of at least one first entry in the second handover command may not be included in the first handover command.

According to various embodiments, the wireless device may identify, in the first handover command, the parameter values of the at least one second entry that are excluded in the second handover command. The wireless device may add the parameter values of the at least one second entry to the second handover command to obtain an updated version of the first handover command (i.e., updated first handover command).

According to various embodiments, the wireless device may replace the parameter values of the at least one first entry in the first handover command with those of the at least one first entry in the second handover command to obtain an updated version of the first handover command.

According to various embodiments, wherein the wireless device may receive the second message comprising the second handover command after the expiry of the validity timer. The second handover command may include parameter values of at least one first entry that are updated from (or, different from) those of the at least one first entry in the first handover command, and include parameter values of at least one second entry that are included in the first handover command. That is, the parameter values of at least one first entry in the second handover command may not be included in the first handover command. The wireless device may replace parameter values of the at least one first entry and the at least one second entry in the first handover command with those of the at least one first entry and the at least one second entry in the second handover command to obtain an updated version of the first handover command.

According to various embodiments, the wireless device may, based on a determination that the second message comprising the second handover command is received after the expiry of the validity timer, discard second handover command. That is, if the wireless device determined that the second message comprising the second handover command is received after the expiry of the validity timer, the second handover command may not be used for updating the first handover command, or may not be used for handover.

According to various embodiment, the wireless device may identify, among indexes related to the handover commands, one or more indexes for which handover conditions are satisfied. Throughout the disclosure, if handover condition for a candidate target cell is satisfied, an index related to a handover command of the target cell may be referred to as 'an index for which handover condition is satisfied'. The wireless device may identify, among the candidate target cells, one or more candidate target cells related to one or more handover commands having the one or more indexes. The wireless device may select a target cell among the one or more candidate target cells for a handover. The wireless device may apply parameter values in the handover command of the target cell to perform a handover to the target cell.

According to various embodiments, the wireless device may perform the handover to the candidate target cell based on parameter values of at least one first entry included in the second handover command, and parameter values of at least one second entry included in the first handover command. The parameter values of at least one second entry are excluded in the second handover command.

So far, conditional handover is described. Conditional handover is a kind of conditional reconfiguration. Herein after, Conditional reconfiguration is described.

The network may configure the UE with conditional reconfiguration (i.e., conditional handover and/or conditional PSCell addition/change) including per candidate target cell an RRCConnectionReconfiguration (i.e., conditional handover command) to only be applied upon the fulfilment of an associated execution condition (i.e., handover condition).

For conditional reconfiguration, the UE shall:
1> if the received conditionalReconfiguration includes the condReconfigurationToRemoveList:
2> perform the conditional reconfiguration removal procedure;
1> if the received conditionalReconfiguration includes the condReconfigurationToAddModList:
2> perform the conditional reconfiguration addition/modification procedure.

I. Conditional Reconfiguration Addition/Modification
The UE shall:
1> for each condReconfigurationId (i.e., index related to a handover command) included in the received condReconfigurationToAddModList:
2> if an entry with the matching condReconfigurationId exists in the condReconfigurationList within the VarConditionalReconfiguration (i.e., list of {index, handover condition, handover command} for each target cell stored in the UE):
3> replace the entry with the values received for this condReconfigurationId;
2> else:
3> add a new entry for this condReconfigurationId within the VarConditionalReconfiguration;
3> store the associated RRCConnectionReconfiguration (i.e., handover command and/or handover condition) in VarConditionalReconfiguration;
2> monitor the triggering conditions (i.e., handover conditions) associated to the measurement identities of that condReconfigurationId;

II. Conditional Reconfiguration Removal
The UE shall:
1> for each condReconfigurationId included in the received condReconfigurationToRemoveList that is part of the current UE configuration in VarConditionalReconfiguration:
2> stop the monitoring of triggering conditions linked by the measurement identities;
2> remove the entry with the matching condReconfigurationId from the condReconfigurationList within the VarConditionalReconfiguration;

The UE does not consider the conditional reconfiguration message as erroneous if the condReconfigurationToRemoveList includes any condReconfigurationId value that is not part of the current UE configuration.

III. Conditional Reconfiguration Execution
For the measId for which the triggering condition for conditional reconfiguration was fulfilled, the UE shall:
1> for each condReconfigurationId within the VarConditionalReconfiguration that has that measId associated to its stored RRCConnectionReconfiguration (i.e., handover command):
2> if all triggering conditions are fulfilled for that condReconfigurationId:
3> consider the target cell candidate within the stored RRCConnectionReconfiguration, associated to that condReconfigurationId, as a triggered cell;
1> if the more than one triggered cell exists:
2> select one of the triggered cells as the selected cell for conditional reconfiguration;
1> for the selected cell of conditional reconfiguration:
2> if the stored RRCConnectionReconfiguration associated to the selected cell includes mobilityControlInfo (conditional handover):
3> apply the stored RRCConnectionReconfiguration associated to that condReconfigurationId and perform a handover to the selected cell;
2> else if the stored RRCConnectionReconfiguration includes nr-Config (conditional PSCell addition/change):
3> apply the stored RRCConnectionReconfiguration associated to that condReconfigurationId and perform the SN change/addition procedure for the selected cell;

If multiple cells are triggered in conditional PSCell addition/change execution, the UE may consider beams and beam quality to select one of the triggered cells for execution.

The structure of the conditional reconfiguration message or the information element (IE) ConditionalReconfiguration may be as the following Table 3. The IE ConditionalReconfiguration may be used to add, modify or release the configuration of a conditional handover, a conditional PSCell addition/change per target candidate cell.

TABLE 3

-- ASN1START
ConditionalReconfiguration-r16 ::= SEQUENCE {
condReconfigurationToAddModList-r16
CondReconfigurationToAddModList-r16
OPTIONAL,   -- Need ON TABLE 3-continued

```
condReconfigurationToRemoveList-r16
CondReconfigurationToRemoveList-r16
OPTIONAL,  -- Need ON
...
}
CondReconfigurationToRemoveList-r16 ::= SEQUENCE (SIZE
(1..maxCondConfig-r16) OF CondReconfigurationId-r16
-- ASN1STOP
```

In Table 3, condReconfigurationToAddModList may refer to list of conditional reconfigurations (i.e. conditional handover or conditional PSCell change/addition) to add and/or modify. Also, condReconfigurationToRemoveList may refer to list of conditional reconfigurations (i.e. conditional handover or conditional PSCell change/addition) to remove. CondReconfigurationId may refer to an index related to a handover command. The contents of the IE CondReconfigurationId may be as the following Table 4. The IE ConditionalReconfigurationId may be used to identify a conditional reconfiguration.

TABLE 4

```
-- ASN1START
CondReconfigurationId-r16 ::=  INTEGER (1.. maxCondConfig-r16)
-- ASN1STOP
```

In Table 4, maxCondConfig may refer to the maximum number of conditional reconfigurations (i.e., CondReconfigurationAddMods). The structure of IE CondReconfigurationToAddModList may be as the following Table 5. The IE CondReconfigurationToAddModList may concern a list of conditional reconfigurations (i.e. conditional handover, conditional PSCell addition/change) to add or modify, with for each entry the measId (associated to the triggering condition configuration) and the associated RRCConnectionReconfiguration.

TABLE 5

```
-- ASN1START
CondReconfigurationToAddModList-r16 ::= SEQUENCE (SIZE (1..
maxCondConfig-r16)) OF CondReconfigurationAddMod-r16
CondReconfigurationAddMod-r16 ::= SEQUENCE {
condReconfigurationId-r16  CondReconfigurationId-r16,
triggerCondition-r16  SEQUENCE (SIZE (1..2)) OF MeasId,
condReconfigurationToApply-r16 OCTET STRING (CONTAINING
RRCConnectionReconfiguration),
...
}
-- ASN1STOP
```

In Table 5, CondReconfigurationAddMod may refer to a conditional reconfiguration for a target cell. CondReconfigurationId may refer to an index of the CondReconfigurationAddMod, which may be related to a handover command of the target cell. The triggerCondition may refer to a handover condition for the target cell. The RRCConnectionReconfiguration contained in the condReconfigurationToApply may refer to a handover command of the target cell. As described above, the conditional reconfiguration may also be referred to as CHO configuration. The structure of the CHO configuration or IE CHOConfiguration may be as the following Table 6:

TABLE 6

```
CHOConfiguration ::=              SEQUENCE {
choToReleaseList-r16              CHOToReleaseList-r16
                                  OPTIONAL,
  -- Need N
choToAddModList-r16               CHOToAddModList-r16
  OPTIONAL  -- Need N
choConditionList                  SEQUENCE (SIZE (1..maxFFS)) OF
CHOCondition-r16 OPTIONAL
}
CHOToReleaseList-r16 ::=          SEQUENCE (SIZE (1..maxCHO))
OF CHOToRelease- r16
CHOToRelease-r16 ::=              SEQUENCE {
choId-r16                             INTEGER (1..maxCHO)
}
CHOToAddModList-r16 ::=           SEQUENCE (SIZE (1..maxCHO))
OF CHOToAddMod- r16
CHOToAddMod-r16 ::=               SEQUENCE {
choId-r16                             INTEGER
(1..maxCHO),
conditionId-r16                       ReportConfigId
    OPTIONAL,   -- Need M
choCellConfiguration-r16              OCTET STRING
                                      (CONTAINING FFS
for CHOCellConfiguration-r16)     OPTIONAL,   -- Need M
}
```

In Table 6, CHOToReleaseList may correspond to condReconfigurationToRemoveList. CHOToAddModList may correspond to CondReconfigurationToAddModList. CHOCondition may correspond to triggerCondition. The maxCHO may correspond to maxCondConfig. That is, the maxCHO may refer to the maximum number of CHO configurations (i.e., CHOToAddMods). The choId may correspond to condReconfigurationId. CHOToAddMod may correspond to CondReconfigurationToAddMod, which may refer to a CHO configuration for a target cell. The choId may refer to an index of the CondReconfigurationToAddMod, which may be related to a handover command of the target cell. The conditionId may refer to an index of the CHOCondition (i.e., handover condition for the target cell), which may be related to a choConditionConfig. The CHOCellConfiguration contained in the choCellConfiguration may refer to a handover command of the target cell. The choCellConfiguration may correspond to condReconfigurationToApply. The structure of IE CHOCondition may be as the following Table 7:

TABLE 7

```
-- ASN1START
-- TAG-CHOTRIGGERCONDITION-START
CHOCondition-r16-IEs ::=  SEQUENCE {
conditionId-r16  ReportConfigId
choConditionConfig  CHOConditionConfig-r16  OPTIONAL
    -- Cond NewID
}
CHOConditionConfig-r16-IE ::=  SEQUENCE {
eventId  CHOICE {
eventA3  SEQUENCE {
a3-Offset  MeasTriggerQuantityOffset,
hysteresis  Hysteresis,
timeToTrigger  TimeToTrigger,
},
eventA5  SEQUENCE {
a5-Threshold1  MeasTriggerQuantity,
a5-Threshold2  Meas TriggerQuantity,
hysteresis  Hysteresis,
timeToTrigger  TimeToTrigger,
},
...
},
rsType  NR-RS-Type,
...
```

TABLE 7-continued

```
}
-- TAG-CHOTRIGGERCONDITION-STOP
-- ASN1STOP
```

The present disclosure may be applied to various future technologies, such as AI, robots, autonomous-driving/self-driving vehicles, and/or extended reality (XR). <AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 20:
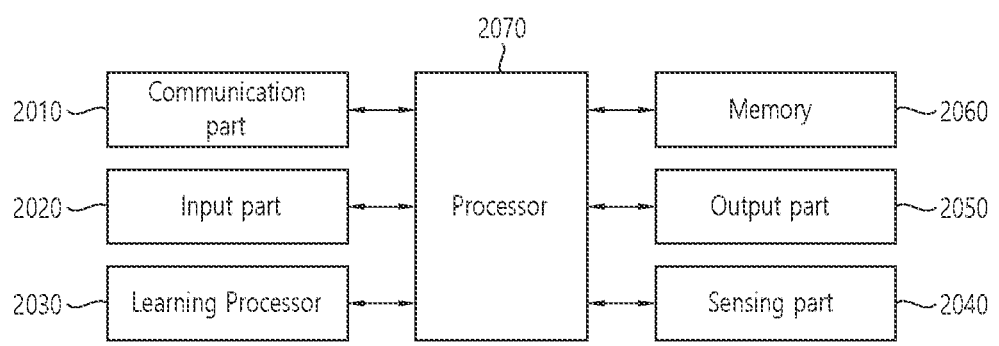
FIG. 20 shows an example of an AI device to which the technical features of the present disclosure can be applied.

FIG. 20 shows an example of an AI device to which the technical features of the present disclosure can be applied.

The AI device 2000 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 20, the AI device 2000 may include a communication part 2010, an input part 2020, a learning processor 2030, a sensing part 2040, an output part 2050, a memory 2060, and a processor 2070.

The communication part 2010 can transmit and/or receive data to and/or from external devices such as the AI devices and the AI server using wire and/or wireless communication technology. For example, the communication part 2010 can transmit and/or receive sensor information, a user input, a learning model, and a control signal with external devices. The communication technology used by the communication part 2010 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 2020 can acquire various kinds of data. The input part 2020 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 2020 can acquire input data to be used when acquiring an output using learning data and a learning model for model learning. The input part 2020 may obtain raw input data, in which case the processor 2070 or the learning processor 2030 may extract input features by preprocessing the input data.

The learning processor 2030 may learn a model composed of an ANN using learning data. The learned ANN can be referred to as a learning model. The learning model can be used to infer result values for new input data rather than learning data, and the inferred values can be used as a basis for determining which actions to perform. The learning processor 2030 may perform AI processing together with the learning processor of the AI server. The learning processor 2030 may include a memory integrated and/or implemented in the AI device 2000. Alternatively, the learning processor 2030 may be implemented using the memory 2060, an external memory directly coupled to the AI device 2000, and/or a memory maintained in an external device.

The sensing part 2040 may acquire at least one of internal information of the AI device 2000, environment information of the AI device 2000, and/or the user information using various sensors. The sensors included in the sensing part 2040 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 2050 may generate an output related to visual, auditory, tactile, etc. The output part 2050 may include a display unit for outputting visual information, a speaker for outputting auditory information, and/or a haptic module for outputting tactile information.

The memory 2060 may store data that supports various functions of the AI device 2000. For example, the memory 2060 may store input data acquired by the input part 2020, learning data, a learning model, a learning history, etc.

The processor 2070 may determine at least one executable operation of the AI device 2000 based on information determined and/or generated using a data analysis algorithm and/or a machine learning algorithm. The processor 2070 may then control the components of the AI device 2000 to perform the determined operation. The processor 2070 may request, retrieve, receive, and/or utilize data in the learning processor 2030 and/or the memory 2060, and may control the components of the AI device 2000 to execute the predicted operation and/or the operation determined to be desirable among the at least one executable operation. The processor 2070 may generate a control signal for controlling the external device, and may transmit the generated control signal to the external device, when the external device needs to be linked to perform the determined operation. The processor 2070 may obtain the intention information for the user input and determine the user's requirements based on the obtained intention information. The processor 2070 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 2030 and/or learned by the learning processor of the AI server, and/or learned by their distributed processing. The processor 2070 may collect history information including the operation contents of the AI device 2000 and/or the user's feedback on the operation, etc. The processor 2070 may store the collected history information in the memory 2060 and/or the learning processor 2030, and/or transmit to an external device such as the AI server. The collected history information can be used to update the learning model. The processor 2070 may control at least some of the components of AI device 2000 to drive an application program stored in memory 2060. Furthermore, the processor 2070 may operate two or more of the components included in the AI device 2000 in combination with each other for driving the application program.

Figure 21:
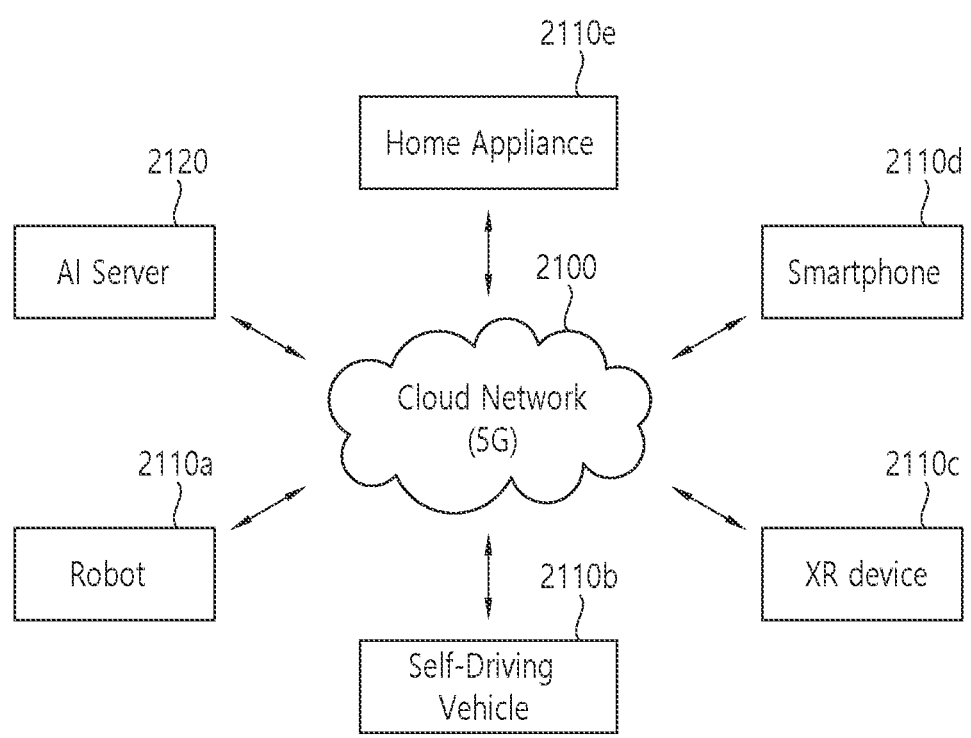
FIG. 21 shows an example of an AI system to which the technical features of the present disclosure can be applied.

FIG. 21 shows an example of an AI system to which the technical features of the present disclosure can be applied.

Referring to FIG. 21, in the AI system, at least one of an AI server 2120, a robot 2110a, an autonomous vehicle 2110b, an XR device 2110c, a smartphone 2110d and/or a home appliance 2110e is connected to a cloud network 2100. The robot 2110a, the autonomous vehicle 2110b, the XR device 2110c, the smartphone 2110d, and/or the home appliance 2110e to which the AI technology is applied may be referred to as AI devices 2110a to 2110e.

The cloud network 2100 may refer to a network that forms part of a cloud computing infrastructure and/or resides in a cloud computing infrastructure. The cloud network 2100 may be configured using a 3G network, a 4G or LTE network, and/or a 5G network. That is, each of the devices 2110a to 2110e and 2120 consisting the AI system may be connected to each other through the cloud network 2100. In particular, each of the devices 2110a to 2110e and 2120 may communicate with each other through a base station, but may directly communicate with each other without using a base station.

The AI server 2120 may include a server for performing AI processing and a server for performing operations on big data. The AI server 2120 is connected to at least one or more of AI devices constituting the AI system, i.e. the robot 2110a, the autonomous vehicle 2110b, the XR device 2110c, the smartphone 2110d and/or the home appliance 2110e through the cloud network 2100, and may assist at least some AI processing of the connected AI devices 2110a to 2110e. The AI server 2120 can learn the ANN according to the machine learning algorithm on behalf of the AI devices 2110a to 2110e, and can directly store the learning models and/or transmit them to the AI devices 2110a to 2110e. The AI server 2120 may receive the input data from the AI devices 2110a to 2110e, infer the result value with respect to the received input data using the learning model, generate a response and/or a control command based on the inferred result value, and transmit the generated data to the AI devices 2110a to 2110e. Alternatively, the AI devices 2110a to 2110e may directly infer a result value for the input data using a learning model, and generate a response and/or a control command based on the inferred result value.

Various embodiments of the AI devices 2110a to 2110e to which the technical features of the present disclosure can be applied will be described. The AI devices 2110a to 2110e shown in FIG. 21 can be seen as specific embodiments of the AI device 2000 shown in FIG. 20.

The present disclosure can have various advantageous effects.

For example, by transmitting an updated handover command including updated configuration parameters and excluding configuration parameters included in a previously transmitted handover command (i.e., configuration parameters that are not updated or remain the same), the network can send a handover command of reduced sized to the wireless device, in particular when multiple target cells are configured for conditional handover.

For example, it is beneficial to reduce signalling overhead in case when multiple target cells are configured for conditional handover or when conditional handover command is updated that the network transmits an updated handover command including updated configuration parameters and excluding configuration parameters included in a previously transmitted handover command (i.e., configuration parameters that are not updated or remain the same).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a network node configured to operate in a wireless communication system, the method comprising:

transmitting, to a user equipment (UE), one or more handover commands, wherein each of the one or more handover commands comprises an identifier of a corresponding handover command, and a handover condition and a random access preamble for a corresponding target cell; and transmitting, to the UE, a first handover command comprising an identifier of the first handover command, wherein the handover condition is evaluated based on updating a list of handover commands including the one or more handover commands, and wherein the updating of the list of handover commands comprises:

determining whether a second handover command with an identifier matching the identifier of the first handover command exists among the one or more handover commands;

based on a determination that the second handover command exists among the one or more handover commands, replacing one or more parameter values in the second handover command with one or more parameter values in the first handover command; and based on a determination that the second handover command does not exist among the one or more handover commands, adding the first handover command to the list of handover commands.

2. The method of claim 1, wherein the first handover command is related to a validity timer which starts to run upon receiving the first handover command, and wherein the first handover command is valid while the validity timer is running, and is invalid after an expiry of the validity timer.

3. The method of claim 1, wherein the first handover command excludes at least one parameter value included in the second handover command.

4. The method of claim 3, wherein the replacing of the one or more parameter values in the second handover command comprises adding the at least one parameter value to the first handover command.

5. The method of claim 1, wherein the UE is in communication with at least one of another UE, a network or an autonomous vehicle.

6. A network node configured to operate in a wireless communication system comprising:

a transceiver;

at least one processor; and at least one memory operatively coupled to the at least one processor and storing instructions that, based on being executed by the at least one processor, perform operations comprising:

transmitting, to a user equipment (UE), one or more handover commands, wherein each of the one or more handover commands comprises an identifier of a corresponding handover command, and a handover condition and a random access preamble for a corresponding target cell; and transmitting, to the UE, a first handover command comprising an identifier of the first handover command, wherein the handover condition is evaluated based on updating a list of handover commands including the one or more handover commands, and wherein the updating of the list of handover commands comprises:

determining whether a second handover command with an identifier matching the identifier of the first handover command exists among the one or more handover commands;

based on a determination that the second handover command exists among the one or more handover commands, replacing one or more parameter values in the second handover command with one or more parameter values in the first handover command; and based on a determination that the second handover command does not exist among the one or more handover commands, adding the first handover command to the list of handover commands.

7. The network node of claim 6, wherein the first handover command is related to a validity timer which starts to run upon receiving the first handover command, and wherein the first handover command is valid while the validity timer is running, and is invalid after an expiry of the validity timer.

8. The network node of claim 6, wherein the first handover command excludes at least one parameter value included in the second handover command.

9. The network node of claim 8, wherein the replacing of the one or more parameter values in the second handover command comprises adding the at least one parameter value to the first handover command.

10. A user equipment (UE) configured to operate in a wireless communication system comprising:

a transceiver;

at least one processor; and at least one memory operatively coupled to the at least one processor and storing instructions that, based on being executed by the at least one processor, perform operations comprising:

receiving, from a network, one or more handover commands, wherein each of the one or more handover commands comprises an identifier of a corresponding handover command, and a handover condition and a random access preamble for a corresponding target cell;

receiving, from the network, a first handover command comprising an identifier of the first handover command;

updating a list of handover commands including the one or more handover commands based on the identifier of the first handover command; and evaluating the handover condition based on the updating of the list of handover commands, wherein the updating of the list of handover commands comprises:

determining whether a second handover command with an identifier matching the identifier of the first handover command exists among the one or more handover commands;

based on a determination that the second handover command exists among the one or more handover commands, replacing one or more parameter values in the second handover command with one or more parameter values in the first handover command; and based on a determination that the second handover command does not exist among the one or more handover commands, adding the first handover command to the list of handover commands.

\* \* \* \* \*